United States Patent
Tee et al.

(10) Patent No.: US 11,886,836 B2
(45) Date of Patent: Jan. 30, 2024

(54) DYNAMIC ENTERPRISE APPLICATION PLATFORM

(71) Applicant: GNEY SOFTWARE PTE LTD, Singapore (SG)

(72) Inventors: Ke Yeng Tee, Singapore (SG); Sze Wah Tan, Singapore (SG)

(73) Assignee: GNEY SOFTWARE PTE LTD, Singapore (SG)

( * ) Notice: Subject to any disclaimer, the term of this patent is extended or adjusted under 35 U.S.C. 154(b) by 159 days.

(21) Appl. No.: 17/626,980

(22) PCT Filed: Nov. 24, 2020

(86) PCT No.: PCT/SG2020/050687
§ 371 (c)(1),
(2) Date: Jan. 13, 2022

(87) PCT Pub. No.: WO2022/115030
PCT Pub. Date: Jun. 2, 2022

(65) Prior Publication Data
US 2023/0266946 A1 Aug. 24, 2023

(51) Int. Cl.
| | |
|---|---|
| *G06F 16/245* | (2019.01) |
| *G06F 16/248* | (2019.01) |
| *G06F 9/451* | (2018.01) |
| *G06F 9/445* | (2018.01) |
| *G06F 8/20* | (2018.01) |
| *G06F 8/34* | (2018.01) |
| *G06F 8/77* | (2018.01) |

(52) U.S. Cl.
CPC ............... *G06F 8/20* (2013.01); *G06F 8/34* (2013.01); *G06F 8/77* (2013.01)

(58) Field of Classification Search
CPC ..... G06F 8/20; G06F 8/34; G06F 8/77; G06F 8/35; G06F 8/38; G06F 16/254; G06F 16/9577; G06F 40/295; G06F 40/30; G06F 40/117; G06F 40/106; G06F 11/36; G06F 11/3696; G06F 11/3688; G06F 8/10; G06N 20/00; G06N 3/08
See application file for complete search history.

(56) References Cited

U.S. PATENT DOCUMENTS 7,448,024 B2 * 11/2008 Breeden ............... G06F 8/20
717/125
11,216,453 B2 * 1/2022 Papale ............ G06F 16/245

* cited by examiner

*Primary Examiner* — Thuy Dao
(74) *Attorney, Agent, or Firm* — WPAT, P.C.

(57) ABSTRACT

The instant invention provides a Dynamic Enterprise Application Platform and a method accordingly for development of application software in a computer system in which users develop application software for their enterprise without the assistance of software consultants. The platform comprises an Enterprise Software Design Model which works with and an Enterprise Software Engine. Data and information gathered by users are configured by the Enterprise Software Design Model and saved into database in the Enterprise Software Engine. The Enterprise Software Engine performs a mapping and reduction procedure to create functional enterprise software application using visual editor with drag and drop interface.

17 Claims, 18 Drawing Sheets

FIG 10

FIG 11

| | From [State] | Activity -(activity)-> | To [state] |
|---|---|---|---|
| 1 | start | (Activity 1) | [State X] |
| 2 | [State X] | (Activity 2) | [State Z] |
| 3 | [State Z] | (Activity 3) | [State W] |
| 4 | [State W] | (Activity 4) | If condition 1 met, [State X] else, [State V] |

|   | From [state] | Activity -(activity)-> | To [state] |
|---|---|---|---|
| 1 |  | Create | [Pending Approval] |
| 2 | [Pending Approval] | Approve | [Approved] |
| 3 | [Pending Approval] | Reject | [Rejected] |
| 4 |  | Cancel | [Cancelled] |

| Information | Activity | State | Flow |
|---|---|---|---|
| Employee Name<br>Leave Type<br>Reason of Rejection<br>Start Date<br>End Date | Approve<br>Reject<br>Cancel | Pending Approval<br>Approved<br>Rejected<br>Cancelled | Pending Approval -><br>Approve -> Approved<br>Pending Approval -><br>Reject -> Rejected<br>Pending Approval -><br>Cancel ->Cancelled |
| Standard | Listing | Template | Logic |
| Create<br>View<br>Edit | Pending Approval<br>Approved<br>Rejected<br>All | Leave Application Form | |

FIG 16

DYNAMIC ENTERPRISE APPLICATION PLATFORM

FIELD OF INVENTION

The present invention relates to a Method for developing Software Application for Enterprises including use of an Enterprise Software Design Model and an Enterprise Software Engine in which users without software and programming knowledge develop application software for their enterprise without the assistance of software consultants.

BACKGROUND

Existing approaches of development, launch, maintenance and updating of enterprise level software requires users or consultants to design step by step to dictate computer (either through programming/coding or in low code platform (through User interface) on how to respond to users' interaction in an enterprise software.

Such enterprise level software design requres technically trained personnel which in turn requires communication between a technical person (software developer) and non-technical person but expert in the process (business process developer). One approach is through use of Unified Modeling Language (UML) which is a graphical language for visualizing, specifying, constructing, and documenting the artifacts of a software-intensive system. The UML offers a standard way to write a system's blueprints, including conceptual things such as business processes and system functions as well as concrete things such as programming language statements, database schemas, and reusable software components. As understanding of a design such as UML or BP M N requires technical knowledge, the business process developer may not have sufficient knowledge to understand the systems design, resulting in the breakdown of feedback loop and communication breakdown. Users would usually need to design through UML or User Interface, flow of each user interface page or screen, and then either through traditional coding method or low code platform user interface to develop the enterprise application.

The end result is the users may not get what they requested for initially and more work and time has to be spent refining the users' information and work requirements to achieve an efficient and productive enterprise software application.

Progress has been made to enable users to build application systems as far as permissible. This was based on Low-Code approach which aims to develop software using visual editor with drag and drop interface and minimum coding. Use of low code approach still require programmers with technical knowledge and certain level of programming knowledge.

Current low-code approach requires technical knowledge and programming knowledge though could be minimum. Current no-code approach requires software design experience though programming knowledge may not be required. In the no-code approach, software is developed using visual editor with drag and drop interface without coding The twin developments of no-code approach and citizen developers have created incentive for the Inventors to create a simple method of developing enterprise software application to enable and empower uses in their own enterprises to develop software applications without acquiring technical and programming knowledge.

This simple method of involving users to develop enterprise software aplications has also eliminated the role of technical specialists to review the internal processes of an enterprise and interact with users in order to fully understand business processes in the enterprise, a process which is time consuming and costly.

DISCUSSION OF PRIOR ART

The prior art discussion given herein is to discuss the development of software development for building enterprise software applications from the traditional approach to recent developments wherein low code is development of software using visual editor with drag and drop interface and minimum coding.

US 20180024814A1 describes a system and method for automatically generating enterprise software applications with minimal level of manual coding. The preferred embodiment provide a graphical design tool that models an application using Unified Model Language (UML), validate the UML model, and automatically generate deployable application The preferred embodiment also provides a framework of libraries that the target application ca be build from.

U.S. Pat. No. 9,823,900 B2 describes a system and method for automatically generating enterprise software applications with minimal level of manual coding using a graphical design tool that models an application using Unified Model Language (UM L), validate the UM L model and automatically generate deployable application.

US Patent Publication No. 2020/0234241 describes a system for enterprise level software project management which includes a project builder configured to build an enterprise-level software development project based on received user intent data and IT environment data retrieved from the system inventory database. The software development projects includes a multi-tier hierarchy that provides hierarchal linking between a plurality of project tiers of the software development project. The system also includes a project management engine configured to enable a user to manage the software development project via an interactive dashboard.

The inventors note that prior art uses 'App builder' or 'Low code platform which require the enterprise and users to go through several steps such as a technical solution design step, user interface design step, code generation and deployment steps. These steps require the deployment of external resources in the form of programmers, which would increase costs but at the same time cause delays due to the need for these progrmmers to understand the procedures and systems of the enterprise.

What is needed is to bypass technical solution design, user interface design, code generation and deployment steps. It would be desirable to empower users in the enterprise to design and build software applications for their own use, since users are the best people to understand their requirements and work related and reporting related needs.

The present invention discloses a new requirements gathering Enterprise Software Design Model which works with a newly developed Enterprise Software Engine that would transform the data and information gathered by a mapping and reduction procedure into functional enterprise software application without the users undertaking any programming/coding. Furthermore the inventive method may be easily taught to users without any technical knowledge or with less than 2 hours of training.

The present invention discloses a method to develop software using visual editor with drag and drop interface but without coding. The invention do not require technical steps or technical knowledge requirements end-to-end (from requirements to ready-to-use enterprise solution), hence truly enabling enterprise software to be built by citizen developers.

SUMMARY OF INVENTION

A first object of the invention is a Dynamic Enterprise Application Platform for development of application software in a computer system in which users develop application software for their enterprise without the assistance of software consultants, comprising:
an Enterprise Software Design Model (ESDM) which works with
an Enterprise Software Engine
wherein the ESDM is a template for the users to submit details of a specific application and data and information gathered by the users are configured by the Enterprise Software Design Model and saved into database in the Enterprise Software Engine which performs a mapping and reduction procedure to create functional enterprise software application using visual editor with drag and drop interface, without the users undertaking any programming/coding training.

Preferably the Dynamic Enterprise Application Platform for development of application software has a plurality of forms of enterprise software are rendered onto Desktop Application, Mobile/Tablet Application, and Web/Cloud Application.

Preferably the Dynamic Enterprise Application Platform for development of application software allows the data and information to be configured and consolidated into a single page or single screen of the Desktop Application, the Mobile/Tablet Application, and the Web/Cloud Application.

Preferably the Dynamic Enterprise Application Platform for development of application software has an Enterprise Software Design Model comprising three sections, including Core, Common and Advanced Section.

Preferably the Dynamic Enterprise Application Platform for development of application software comprises Information, Activity, State and Flow section wherein:
the Information section is information gathered or generated in a process or entry;
the Activity section is the action being done in a process and the information gathered or generated during that time;
the State section is a summary of the status of a process or record; and
the Flow section describes the possible activites to be performed for a state in a process or record.

Preferably the Dynamic Enterprise Application Platform for development of application software comprises Listing, Standard, Template and Logic section, wherein:
the Listing section describes different grouping of the records or entities based on designated filters and conditions;
the Standard section describes common features existing in enterprise software, such as create, edit, delete, or view;
the Template section describes formatted document or customized report that is to be generated; and
the Logic section is special business logic to be performed to retrieve or aggregate data for display or generating report as well as supporting integration of external services.

Preferably the Dynamic Enterprise Application Platform for development of application software comprises Aesthetic, Authorisation and Automation section, wherein:

the Aesthetic section refers to design of the form such as layout, contents, formatting of text and number, as well as formulas;
the Authorization section describes the rights to access, execute or view for an user or group of users; and
the Automation section occurs when some events happened and the Enterprise Software Engine (ESE) are triggered, sending notifications such as email, message or SMS, or integration to other online services, or internal action to update the record.

Preferably the Dynamic Enterprise Application Platform for development of application software comprises five sections, including Menu, List, Action, Form and Document.

Preferably the Dynamic Enterpise Application Platform for development of application software has a Menu Section of the Enterprise Software Engine to serve primarily as entry or starting point in accessing a module in a developed enterprise software.

Preferably the Dynamic Enterprise Application Platform for development of application software has a List Section of the Enterprise Software Engine which combines with an user interface to show collection of entries or records, representing the entries or records in different format, including a table form, a list form and a card form and for user to search, query or filter records, group and sort search results and allow the user to navigate through different pages of results.

Preferably the Dynamic Enterprise Application Platform for development of application software has an Action Section in the Enterprise Software Engine includes a plurailty of buttons that represent different functions that can be performed by the users such as viewing or editing an entry, performing an activity or action, or generating a document from an entry and has certain logic to display or hide information from the user based on a plurality of set conditions.

Preferably the Dynamic Enterprise Application Platform for development of application software has a Form Section in the Enterprise Software Engine which serves as a main working area for the user to fill in information or view an existing entry, and generally comprises a plurality of labels and fields and complex controls such as table or tabs.

Preferably the Dynamic Enterprise Application Platform for development of application software has a Document Section in the Enterprise Software Engine for display of document in the form of plain text, common separated values, spreadsheet or Portable Document Format (PDF) and allows the users to choose to download a displayed document onto a Personal Computer, a Tablet or a Mobile Phone or to print the document.

Preferably the Dynamic Enterprise Application Platform for development of application software has information entered into the Enterprise Software Design Model which are configured, mapped and reduced by the Enterprise Software Engine into a functional software application and which allows iteration effort so that the user may always add in information or activity to the process in order to amend the document or form in real time, whenever the user thinks is necessary without disrupting existing running entries.

A second object of the Invention is a method of creating software application in a Dynamic Enterprise Application Platform having an Enterprise Software Design Model and an Enterprise Software Engine in a computer system, said method allowing users to develop an application software for enterprise without the assistance of software consultants, and without the users undertaking any programming/coding training, comprising the steps of:

creating and configuring data and information using the Enterprise Software Design Model, for processing by the Enterprise Software Engine through a mapping and reduction process; wherein said data and information configured by the Enterprise Software Design Model are saved into a database in the Dynamic Enterprise Software Platform;

creating functional Enterprise Software applicaiton using visual editor with drag and drop interface where the configured data and information of the Enterprise Software Design Model is consolidated into a single page or single screen of a Desktop Application, an Application in a Personal Computer, a Mobile Phone, Tablet and Web/Cloud Based Application; and allowing iteration effort for the user to always add in information or activity to the step of crating the menu, list, action, document or form or the report in order to amend the menu, list, action, document or form in real tme, whenever the user thinks is necessary without disrupting existing running entries.

Preferably the method of creating software application in a Dynamic Enterprise Application Platform includes the step of creating and configuring business requirements through the Core Section, Common Section and Advanced Sections of the Enterprise Software Design Model is to map and to reduce the data and information into the Enterprise Software Engine for a specific application.

Preferably the method of creating software application in a Dynamic Enterprise Application Platform includes the step of getting the mapped and reduced data and information in Enterprise Software Design Model to be further mapped and reduced by the Enterprise Software Engine, and the mapped and reduced data being rendered as menu, list, action, document, and form into a Cloud Based App or an App for use with a Desktop or Personal Computer or a Mobile Phone or a Tablet.

BRIEF DESCRIPTION OF THE DIAGRAMS

For a better understanding of the invention, its advantages, and the objects attained by its use, reference should now be made to the accompanying drawings. The accompanying drawings illustrate one or more embodiments of the invention and together with the description herein, serve to explain the workings and principles of the invention. The diagrams by no means restrict the invention to only what is shown.

FIG. 10 is an example of user interface based on main building block of Menu, Action and List in the Enterprise Software Engine, in accordance with the present invention.

FIG. 11 is an example of user interface illustrating one of the main building blocks, Form in the Enterprise Software Engine, in accordance with the present invention.

FIG. 16 is an example of user interface for developers to configure Enterprise Software Design Model on Dynamic Enterprise Software Platform. Another key advantage of this invention is that all configurations is consolidated into single page (as shown in FIG. 14) or screen (on a mobile phone, Desktop Computer or tablet), in accordance with the present invention.

DETAILED DESCRIPTION OF EMBODIMENTS OF THE INVENTION

The invention is a simple method to enable users to develop software applications for their own business enterprise without acquiring technical and programming knowledge. Consequently, the invention reduces complicated development process and enable users to build enterprise software applications using the information gathered using the Enterprise Software Design Model which are mapped and reduced by the Enterprise Software Engine in simple 3-4 steps (through listing and drag and drop).

Figure 1:
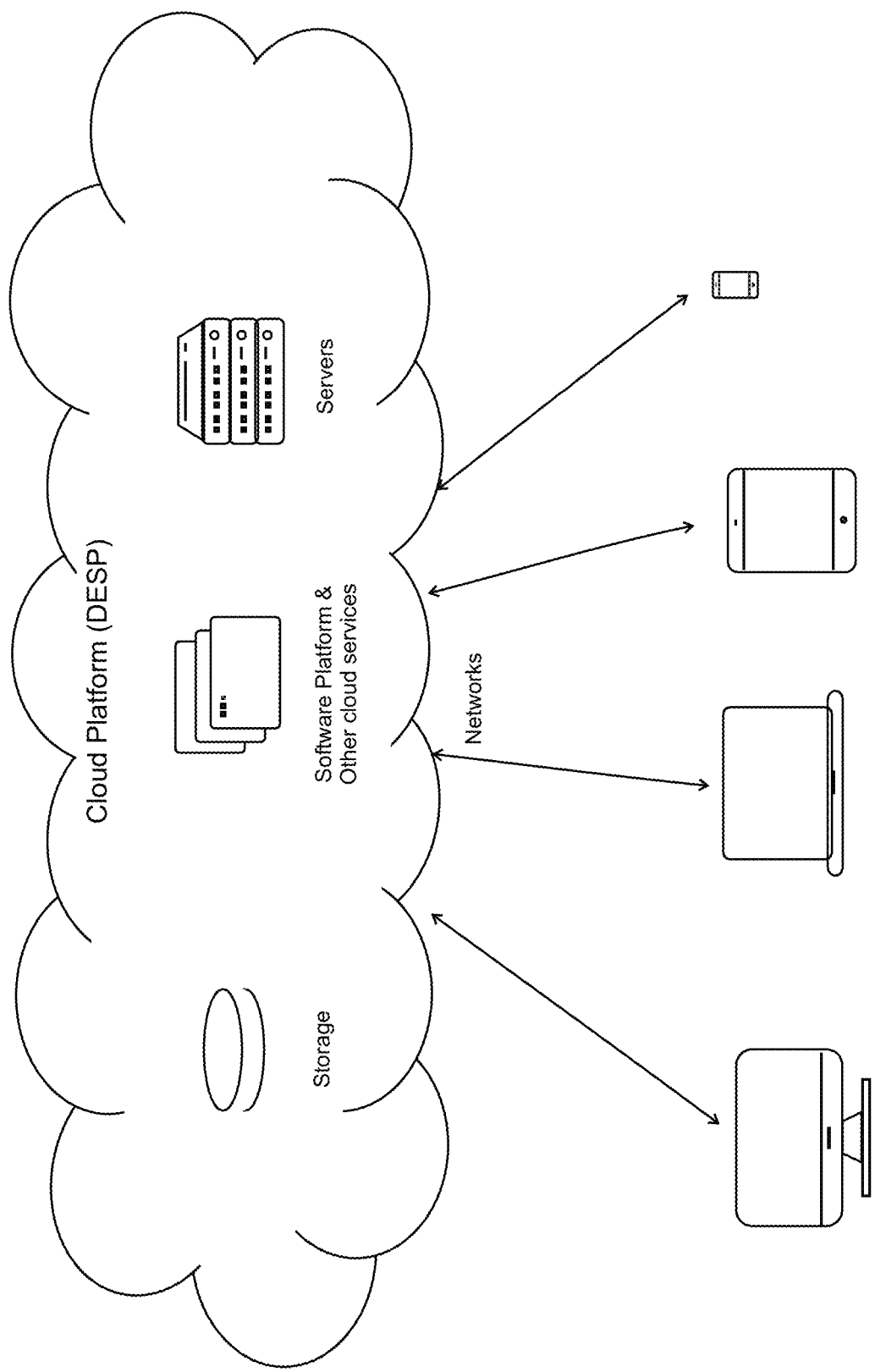
FIG. 1 is a block diagram of a system and computing environment for implementing the present invention.

FIG. 1 is a illustration of an overview of a typical system and computing environment for implementation of the subject invention. The hardware and systems used are typical of any enterprise, where users are entering or retrieving data from their Personal Computers or tablets or even Mobile Phones. The data would be processed by enterprise software applications maintained on remote servers with the data maintained in data storage devices.

The computing system includes processors, memory, mass storage devices peripherals, output devices, input devices, portable storage devices and display systems in various forms.

For purposes of simplicity, the various components shown in FIG. 1 are depicted as being connected via networks (both wired and wireless). The Dynamic Enterprise Application Platform (DESP) may be cloud based or based physiclally within the enterprise.

The computer servers and systems are installed with operating systems (OS) using processors. The processors may be a single microprocessor, or may contain a plurality of microprocessors for configuring the computer system as a multiprocessor system and to execute operating instructions in the DESP and process data in each device. Storage devices stores instructions and data for execution by processors.

Peripheral devices may include any type of computer support device, such as an input/output interface, to add additional functionality to the computer system. For example, peripheral devices may include a network interface for connecting the computer system to a network, a modem, a router, a wireless communication device, etc. Input devices provide a portion of a user interface, and may include a keyboard or pointing device or touchscreen. In order to display textual and graphical information, the computing system will have an output display system, including Personal Computer, Desktops, Laptops, Mobile Phone and Tablets. Output devices may also include printers.

The components depicted in the system overview illustrated in FIG. 1 are those typically found in computing systems suitable for use with the technology described herein, and are intended to represent a broad category of such computer components that are well known in the art. Many different bus configurations, network platforms, operating systems can be used. The technology described herein is not limited to any particular computing system.

Currently software applications are developed for an enterprise using UML, which have infinite possibilities such as placement and style of buttons, font size etc. Therefore low code platforms have to resolve to generating code. The more complicated the scenario or requirements, the greater the need for programmers to convert more functions into Graphical Interface for easy access and configuration. The infinite number of possibilities prevent programmers from using a predefined behaviour schema. This in turn require programmers to use code generation, which require expert users (programmers) with coding and programming knowledge to make necessary adjustment and close the gap.

The present invention also relates to the use of an Enterprise Software Design Model with predefined elements (users' configuration) which are mapped and reduced through an Enterprise Software Engine, using users' configurations to provide a coherent enterprise software application.

Definitions

"Enterprise Software Design Model" (Hereinafter "ESDM")

The Enterprise Software Design Model provides a template for users to submit specific details relating to the specific application they are designing. These specific details are broken down into 3 sections, Core, Common and Advanced.

Core section consists of Information, Activity, State, Flow whereas Common section consists of Listing, Standard, Template and Logic.

Lastly, Advanced section is optional and typically requires software developer to advice and design. It comprises of firstly, Aesthetic, Authorization and Automation.

Core section of ESDM represents the key idea of a module in an enterprise software. It can only be gathered from business domain knowledge of a business process developer. As it separates from implementation details, it can be done by business process developer with few minutes of simple explanation or training. A Designer of ESDM is expected to declare items within the Core section, namely Information, Activity, State, Flow where the order of the items within the list is not important. This declarative method rather than procedural method not only ease the difficulty of business process developer in describing their intention and requirements but also enable users to embrace or amend new changes, if any, during the process. On the other hand, if users were to prepare flow charts or diagrams, not only would it take the right tools and time to prepare, but if there is any changes also it also require huge effort to adjust/update/maintain all related charts and diagrams.

Details of Core Section as Follows:

"Information" is information gathered or generated in a process or entry

"Activity" is the action can be done in a process and describes what are the information gathered or generated during that time "State" is a summary of the status of a process or record "Flow" is the possible activites to be performed for a state in a process or record and the outcome of performing the activities.

Second section of ESDM is referred to as "Common Section". This touches on the common expectation of enterprise software. It relys on the inputs of Core Section. However, these can be done collaboratively together by business process developer and software developer. Business process developer can describe his expectation regarding the software aspect and at the same time, the software developer can share his experience and common practice for an enterprise software and the limitations.

Details of Common section are as follows.

"Listing" describes the different grouping of the records or entities based on designated filters and conditions. For example, in a Leave Application, a 'Pending Approval' listing can be defined by grouping all the submissions of Leave Applications with the State 'Pending Approval'. Likewise 'My Leave' can be defined as all leave applications which had been submitted by a particular user.

"Standard" describes the common features exists in most enterprise software, such as create, edit, delete, or view. This list is prepared by default and allow developers to configure the automation and authorization behaviour. For example, all except users with the role Human Resource (HR) cannot edit a submitted leave application "Template" describes the formatted document or customized report that is to be generated.

"Logic" is special business logic to be performed to retrieve or aggregate data for display or generating report as well as supporting integration of other external services.

Details of Advanced Section as Follows:

"Aesthetic" refers to the design of the form such as layout, contents, formatting of text and number, as well as formulas.

"Authorization" describes the rights to access, execute or view for an user or group of users.

"Automation" occurs when some events happened and the Enterprise Software Engine (ESE) may be triggered, sending notifications such as email, message or SMS, or integration to other online services, or internal action to update the record.

Mapping and reduction process at 1st stage enable the mapping of business requirements and reduction into the designated eight lists (Information, Activity, State, Flow, Standard, Listing, Template, and Logic) and the configurable items (Aesthetic, Authorization and Automation)

"Enterprise Software Engine" (Hereinafter "ESE")

By defining all data and processes using the ESDM, a typical enterprise software application can be mapped and reduced to the elements in the ESE for the creation of a software application. This would enable users to develop enterprise software for organization without acquiring technical and programming knowledge.

The inventive components of the ESE are:

"Menu"—serve as primarily entry or starting point for each module in developed enterprise software application. It consists of the module as well as its submenus which reduced from the Listing on ESDM.

"List"—the combination of user interface to show collection of entries or records. It may be presented in different format such as table form, list form and card form etc. Besides, it also includes controls for user to search, query or filter records, group and sort search results as well as paginator to allow user to navigate through different pages of result.

"Action"—list of buttons that represents different function that can be performed by users such as viewing or editing, performing an activity to an entry or generating a document from an entry or a list of entry. Each action has certain logic to display or hide from the user based on condition "Form"—is the main working area for user to fill in information or view an existing entry. It generally comprises different labels and fields and more complex controls such as table or tabs.

"Document"—is the display of document in the example form of plain texts, common separated values, spreadsheet, or Portable Document Format (PDF). Through this component, user may choose to download the displayed document or print it out.

Other terms used herein to describe how the invention works are:

"Module"—a group of records or processes which share similar attributes and workflows in a system. A module is the design of schema or definition of the records and processes. A module is represented by one Enterprise Software Design Model (ESDM). Interaction is possible between modules in an enterprise software application.

"Entry" denotes a record, job, process, submission, request, or ticket that follows the workflow, or the behaviour described in ESDM, i.e. in a module.

"System" is a combination of Modules working together to achieve the same goal

"Processes"—Activity in the Module

The invention allows iteration effort and users may always add in information or activity whenever the users think are necessary without disrupting existing running entries. This is one of the key advantages of this invention as all the changes can be performed in real time. Therefore users do not have to wait as changes take place immediately right after the change inputs are made to Enterprise Software Engine (ESE). This benefit is unlike the approach in Custom development which requires numerous iterations for repeated testing and bug fixing before the module can be more reliable and stable. The inventive method avoids this scenario of repeated testing and bug fixing since the mapping and reduction technique ensure requirements are mapped to predefined functions or features of the system where information and records are confined to well-defined and tested and confined scenarios designed during the development stage of the Dynamic Enterprise Software Platform. Specifically, the methodology discussed here also significantly reduce the effort needed for design process. ESDM basically consists of few listings, instead of screenshots, flowcharts, diagrams that is technical in nature and which are prepared by software developer. It is a common expectation that developed enterprise software can be run in different platform such as desktop, web, mobile or tablet. This complicates the above-mentioned processes whereas most of these processes must go through again for each of the platform required. For example, mobile and desktop development have to be done in different programming languages as the form factor is different. As such, user interface and layout will have to be redesigned to suit each platform. Deployment also will be more time consuming as different platforms especially mobile app store will have their own app verification process and policy to adhere to, respectively. As for low-code platform that using code generation technique, several programming languages and several templates have to be maintained to generate code for respective platforms.

Another key advantage of this invention is that all configurations is consolidated into single page or screen. This means control over system behavior can be examined and adjustment can be made easily. This also minimizes the learning curve for users encouraging users to explore and discover. This is essential for current fast-changing business landscape, whereby interative approach and changes are welcomed during the development or even during the use of the system. Mapping and reduction technique in this invention ensure functional system all the time, as instead of dictating the step by step on what system behavior should be.

The Dynamic Enterprise Software Platform generates and ensures software integrity and functionality based on the intention of business process developer and software developer rather than their instruction. This eliminates possibility of half baked functions or buttons or very glaring mistakes or bugs in the system.

The inventive method of building a software application for a business enterprise therefore works intuitively for users. Users are also able to see for themselves whether the results reflect the actual process or activity in their part of the enterprise. Users would then be able to correct any activity or logic flow to obtain the desired outcomes.

The invention also caters to the security and other requirements of an enterprise covering: Security aspect of the system configured, ensuring users are authenticated and communication are encrypted and in a secure manner. Also, restrictions of certain users from accessing certain information or data or executing certain activities through authorization. Besides, notification engine is implemented with the capability of sending out reminders, notifications or messages based on certain conditions through SMS, App Notification, Email or other $3^{rd}$ Party communication tool. Lastly, the Dynamic Enterprise Software Platform also provides common integration to popular $3^{rd}$ party systems/applications such as cloud storage, email services etc.

In the following description, for the purposes of explanation, numerous specific details are set forth in order to provide a thorough understanding of the present invention. It will be apparent; however, to one skilled in the art that the invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well-known structures and devices are shown in block diagram form in order to avoid obscuring the details of the disclosed features of various described embodiments.

The invention is a method to enable users to develop enterprise software for their own business enterprise without acquiring technical and programming knowledge. Users are already connected to the enterprise software applications and systems through a Cloud Platform or an off-site where the existing enterprise software and systems and operating software are in use. The devices linking the user to their enterprise system may be a Personal Computer or Tablet or even a Mobile Phone.

Figure 2:
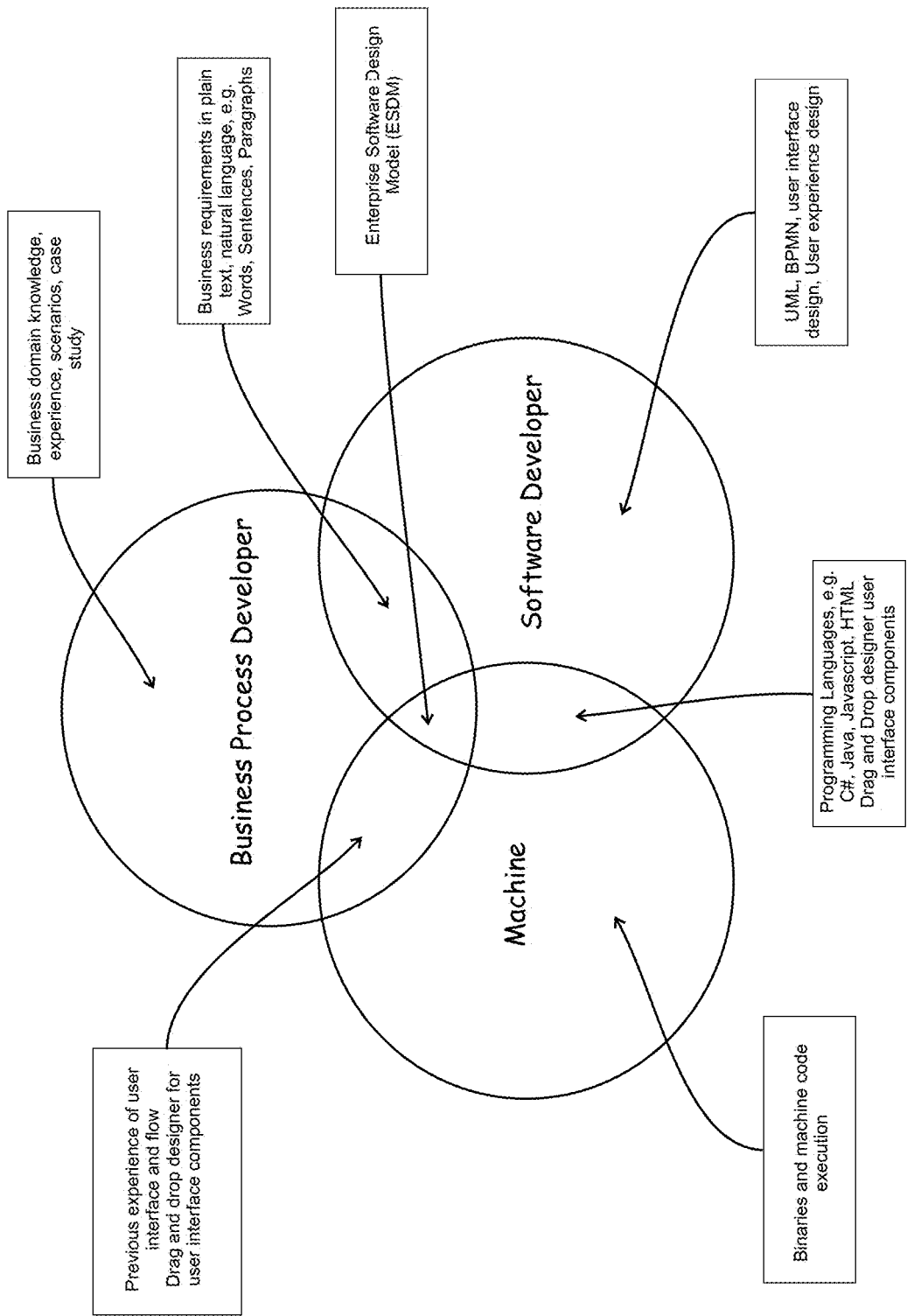
FIG. 2 is a Venn diagram illustrating a common language or communication channel between business process developer, software developer and machine i.e. server, computer, or other electronic devices in accordance with the present invention.

FIG. 2 is a Venn diagram illustrating a common language or communication channel between business process developer, software developer and machine i.e. server, computer. The overlapping roles of a Business Process Developer and Software Developer such as understanding of business requirements of an enterprise and in enterprise software design, has always been recognized and accepted in the creational of software application using traditional approach or even low code approach. The Business Process developer would communicate with the users to develop a list of users' requirements for the application software. The Business Process Developer would then communicate the users' requirements to the Software developer. The invention aims to have common understandings between users, the Business Process Developer and the Software Developer, or even replace the Business Process Developer and the Software Developer.

Figure 3:
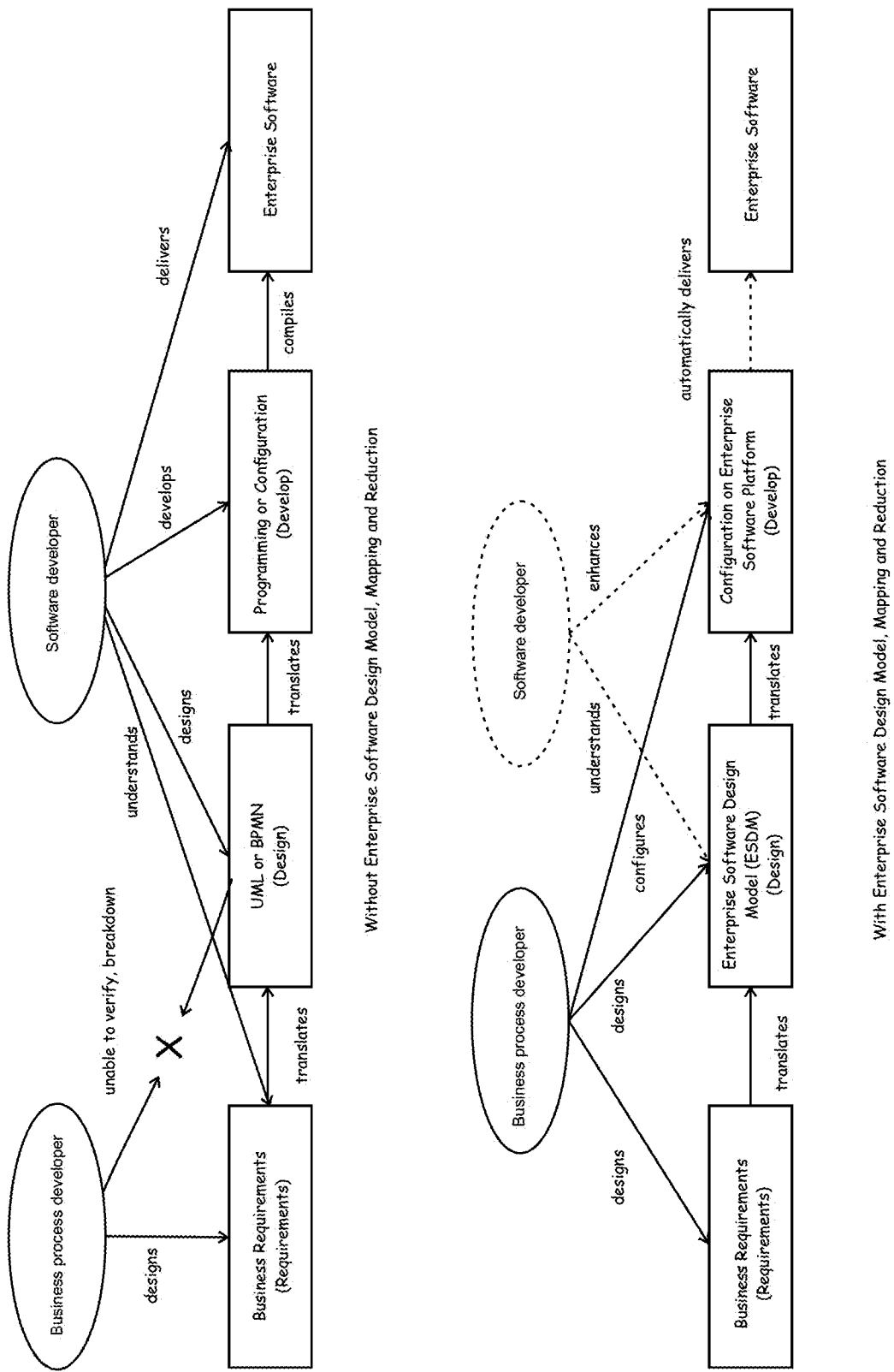
FIG. 3 is a block diagram illustrating the comparison between process enterprise software development with and without Enterprise Software Design Model (ESDM), mapping and reduction process together with different personnel involvement, in accordance with the present invention.

FIG. 3 is a block diagram illustrating the comparison between the process of Enterprise Software development with and without Enterprise Software Design Model (ESDM), mapping and reduction process together with the involvement of different personnel.

The differences in methodology of the Traditional approach and the Invention and the different roles for users, software developer and a business process developer are shown. In a Traditional approach (even with using low-code approach) users are often non-technical in understanding of software development. A Business Process Developer comes in to bridge the gap in knowledge of the systems in the enterprise (for the users) and bridge the gap in knowledge of the systems in the enterprise (for the software developers). The Software Developer would rely on the understanding of how the enterprise works from the business process developer. The Business Process Developer is involved in the gathering of Business requirements, providing details for software designs through extensive documentation. The Software developer would take the details from the Business Process Developer to provide technical documents such as UML and either go through development through programming or (low-code approach) configuration on designated low-code platform and software. The Software Developer would also be responsible for the creation of Enterprise software from the programming or configuration of low-code platform. The deployment of the Business Process Developer and Software Developer would result in higher costs, longer implementation times and sometimes leading to users not able to obtain the applications operating in the way they wish to use.

Figure 4:
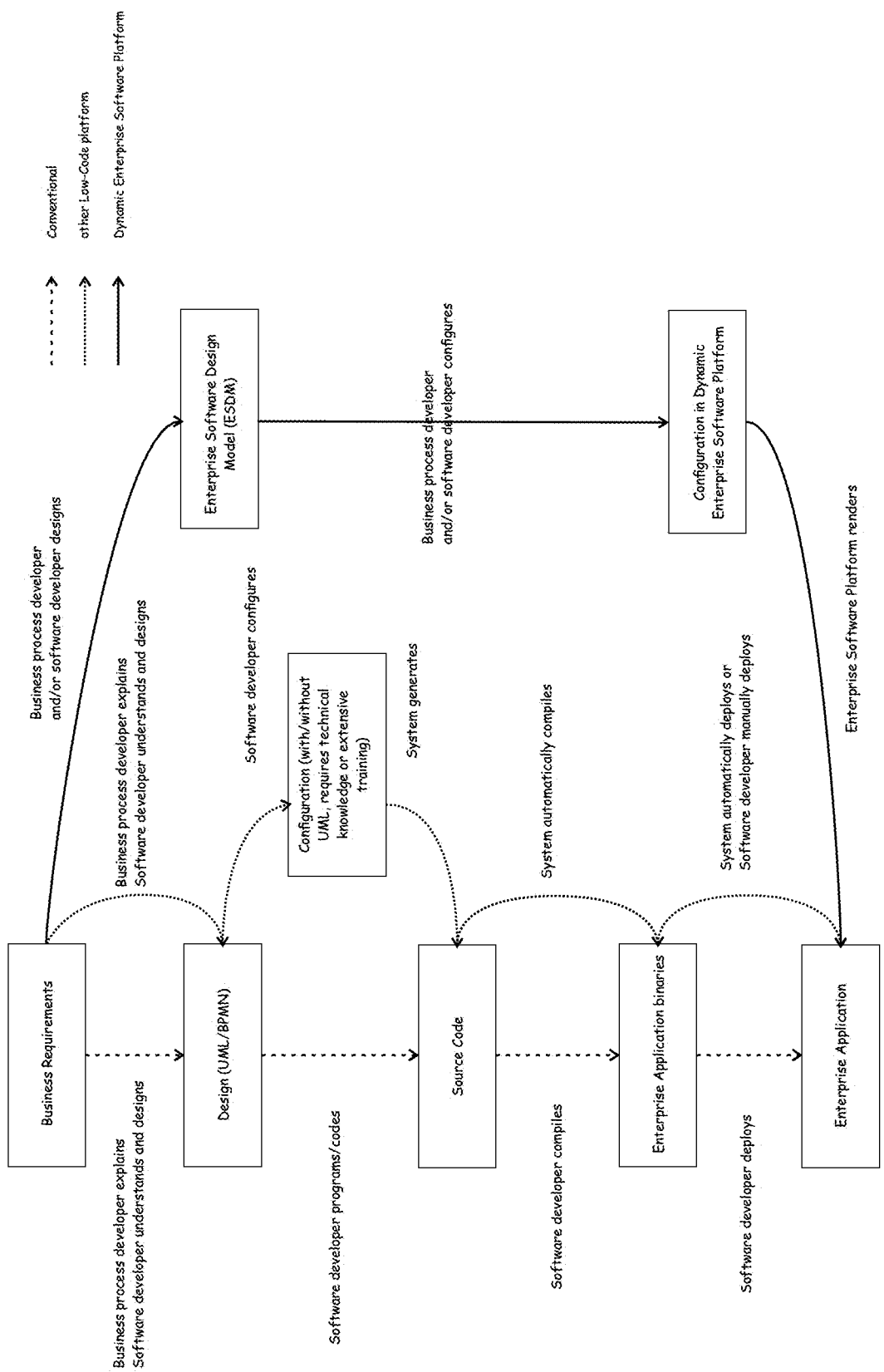
FIG. 4 is a flow diagram illustrating the comparison of the process flow between conventional method, other low-code platform, and Dynamic Enterprise Software Platform.

FIG. 4 is a flow diagram illustrating the comparison of the process flow between the approach in software application development used in a conventional method, an other low-code platform, and the Dynamic Enterprise Software Platform of this invention.

Although the Low Code approach is suppose to simplify the software development process, the Low Code approach is still not productive. The various activities in the Low Code platofrm approach is given below:

| Process | Description | Problem |
|---|---|---|
| Requirements Gathering | Business Process Developer to explain details of a process to Software Developer. | Software Developer requires fully understand the process in detail before any design activity. It is time-consuming as Software Developer requires to understand all the terminology and business process which the Software Developer may not be familiar.<br>It is an error-prone process as any misunderstanding or miscommunication, requires the whole process to be repeated and at worst the whole cycle of software development process to be repeated |

-continued

| Process | Description | Problem |
| --- | --- | --- |
| Requirements Analysis | Based on understanding, Software Developer to analyse the requirements as well as clarify assumptions and details. | Same as above. Business Process Developer is only acts as information giver but not participate in the design, ironically the design must be based on requirements given by Business Process Developer |
| Solution Design | Software Developer to design the software based on UML or BPMN | As UML or BPMN requires technical knowledge to understand, the final design will be not able fully verified by Business Process Developer. Business Process Develop may only be able to verify through screenshots or mock-up screen but not the whole process. |
| Development (Configuration) | Software Engineer to configure the software based on the understanding of UML or BPMN | Software Engineer must be trained and well-versed on UML or BPMN to be able to understand the design and hence do the configuration of the application to expected behaviour on the Low-Code Platform. The result is highly rely on the skillsets and capabilities of software engineer.<br>Besides, most of the function to be developed are basic and repetitive within or across different applications. |
| Testing (Scenario/Load) | Software Engineer to test the developed enterprise application on functional for example whether Edit button is working expectedly. Whereas Business Process Developer will on the other hand testing system based on the scenario they may encounter during their operation. | Significant amount of the time and resource needed to test each function offered by the system and most of those function is basic and repetitive within or across different applications. |
| Deployment | Low-Code platform automate the process of deploying the compiled binaries and database schema on to designated server. | However, the server will have to be setup and configured each time. Besides, different set of software such as Database system will have to be installed and configured before an application can be deployed. |

Figure 5:
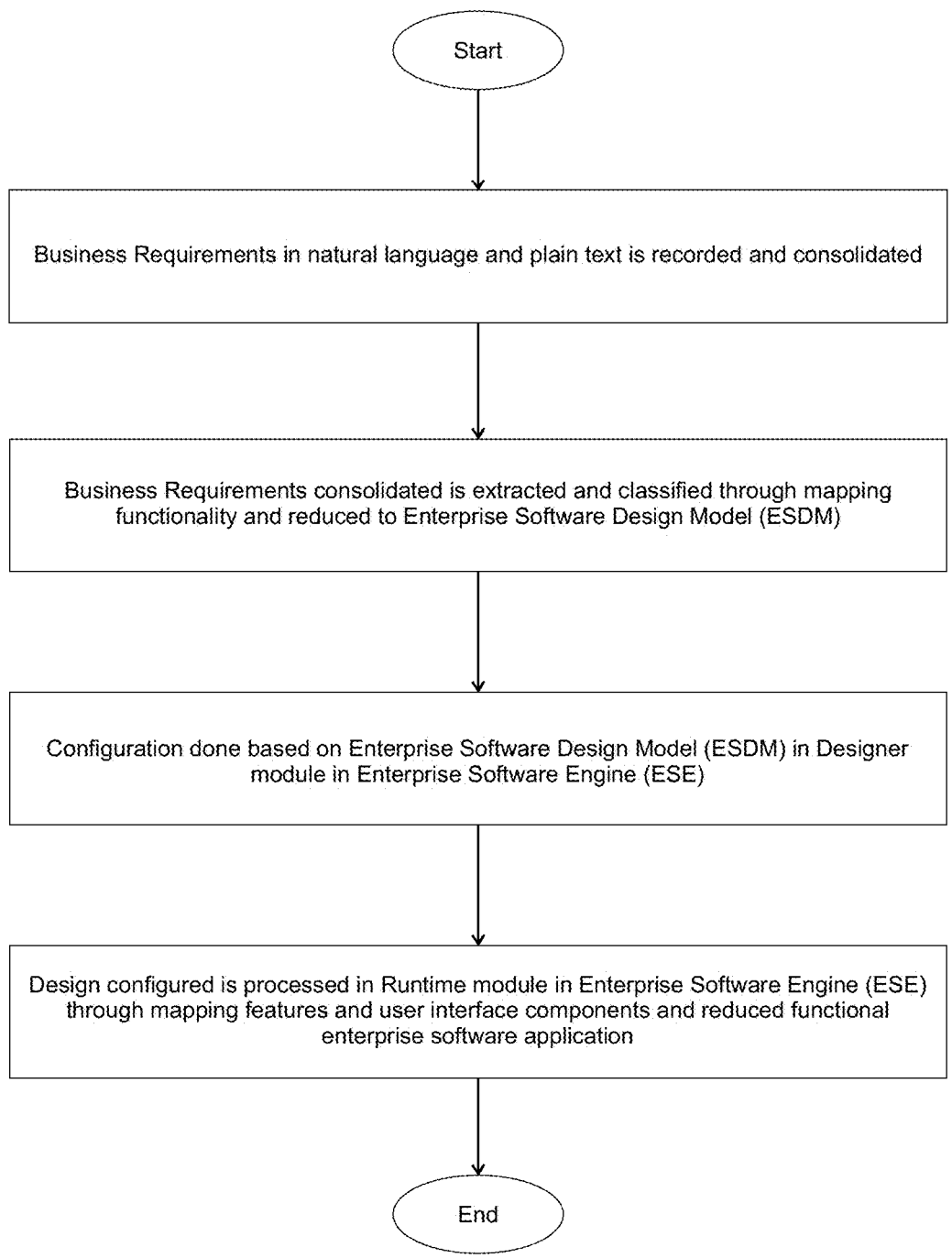
FIG. 5 is a process flow diagram illustrating a process implemented with Dynamic Enterprise Software Platform through mapping and reduction process with Enterprise Software Design Model and Enterprise Software Engine, in accordance with the present invention.

FIG. 5 is a process flow diagram illustrating a process implemented with Dynamic Enterprise Software Platform through mapping and reduction process with Enterprise Software Design Model and Enterprise Software Engine. The invention would enable users to prepare business requirements in a natural language. Plain text is recorded and consolidated. The consolidated business requirements are extracted and classified through mapping functionality and reduced to Enterprise Software Design Model (ESDM). The configuration is based on the ESDM within the Designer Module in the ESE. The Design configured is then processed in Runtime Module in the ESE through mapping features and user interface components and reduced to functional enterprise software application.

Figure 6:
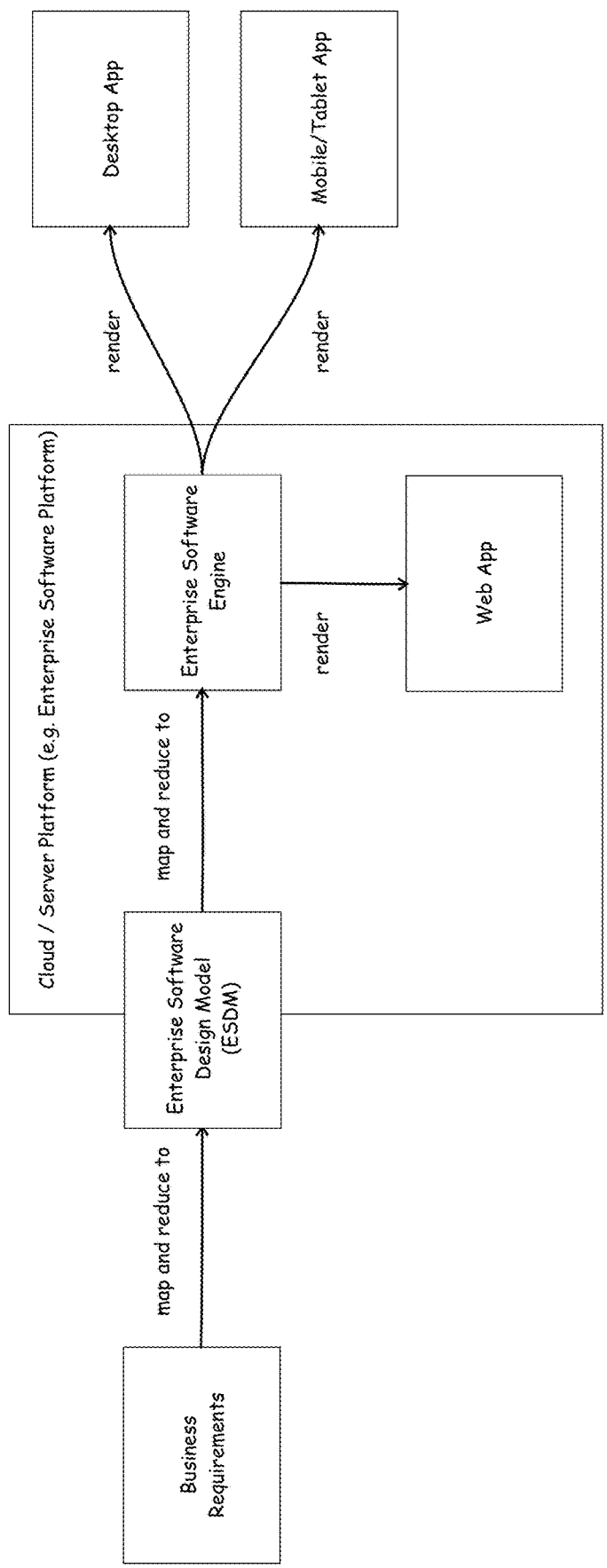
FIG. 6 is a block diagram illustrating an example of architecture of Enterprise Software Platform with mapping and reduction process relationships in the Enterprise Software Design Model and Enterprise Software Engine and its input, i.e. Business Requirements and its output, i.e. enterprise application software in desktop, mobile/tablet, and web app form, in accordance with the present invention.

FIG. 6 is a block diagram illustrating an example of architecture of Enterprise Software Platform with mapping and reduction process relationship in the Enterprise Software Design Model and Enterprise Software Engine and its input, i.e. Business Requirements and output, i.e. enterprise software in desktop, mobile/tablet, and web app form.

The business requirements of the enterprise (from users) are mapped and reduced to the ESDM which are further mapped and reduced to the ESE. The outputs (further user interface) may be rendered to a Desktop App or a Mobile Phone App or a Tablet App or even on the Internet as a Web App.

Figure 7:
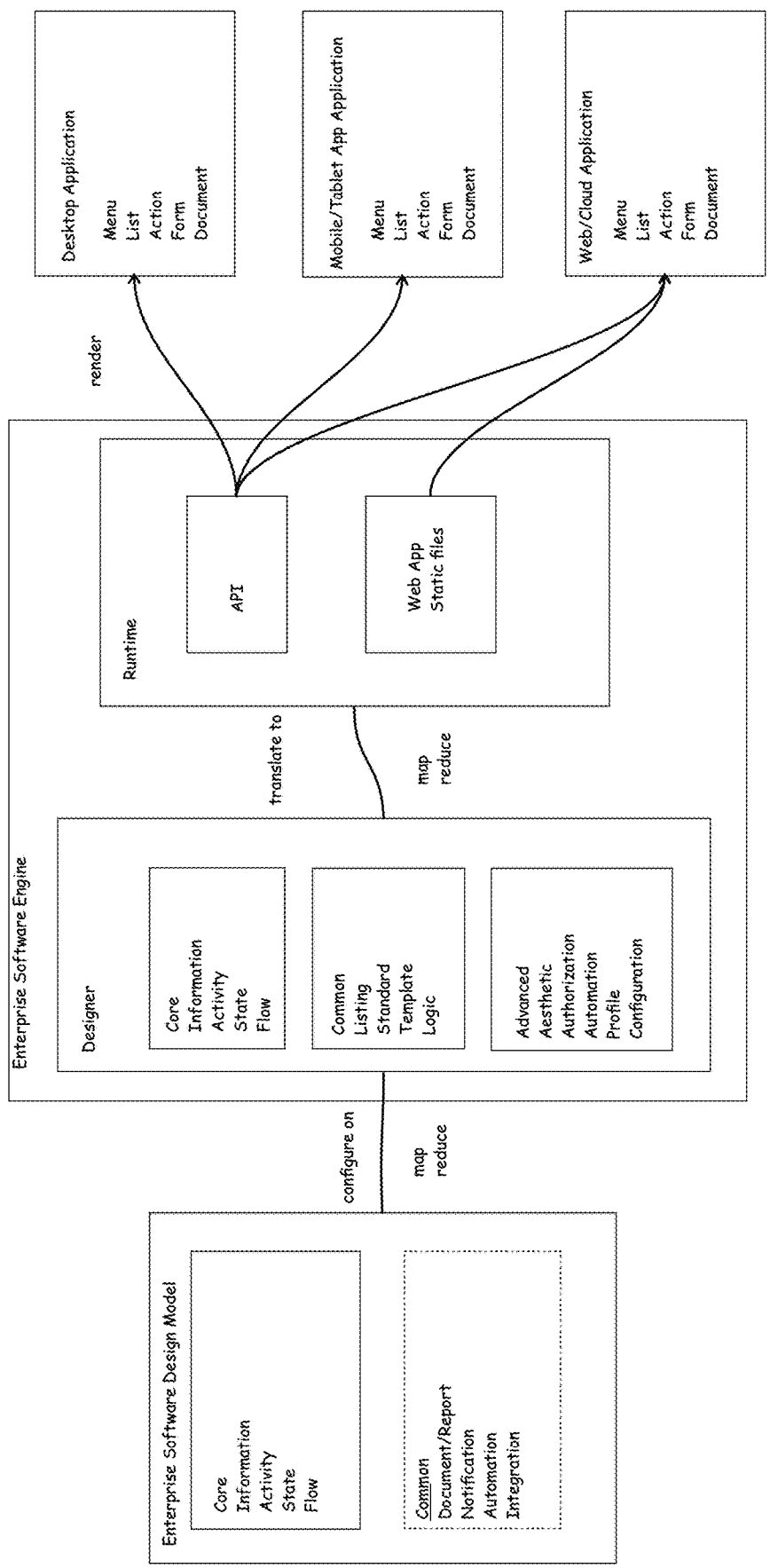
FIG. 7 is a block diagram illustrating structured information in the form of Enterprise Software Design Model passing through Enterprise Software Engine then mapped and reduced into different forms of enterprise software like Desktop Application, Mobile/Tablet Application, and Web/Cloud Application with five main blocking blocks, in accordance with the present invention.

FIG. 7 is a block diagram illustrating structured information in the form of ESDM passing through Enterprise Software Engine then is then mapped and reduced into different forms of enterprise software like Desktop Application, Mobile/Tablet Application, and Web/Cloud Application with five main blocks.

The working relationships between the ESDM and ESE would be described with reference to FIG. 5, FIG. 6 and FIG. 7.

ESDM:
Core Section
1. Information is information gathered or generated in a process or entry
2. Activity is the action can be done in a process and describes what are the information gathered or generated at that particular time.
3. State is a summary of the status of a process or record.
4. Flow is the possible activities that can be done for a state in a process or record and the outcome of performing the activities.

Common Section
5. Listing describes the different grouping of the records or entities based on designated filters and conditions.
6. Standard describes the common features exists in most enterprise software, such as create, edit, delete, or view.
7. Template which describes the formatted document or customized report that to be generated.
8. Logic which is special business logic to be done to retrieve or aggregate data for display or generating report.

Advanced Section

9. Aesthetic is the design of the form such as layout, contents, formatting of text and number, as well as formulas,
10. Authorization describes the rights to access, execute or view for user or group of users.
11. Automation when some events are happened, Enterprise Software Engine (ESE) may trigger sending notification such as email, message or SMS, or integration to other online services, or internal action to the record.

All 3 section parts namely Core, Common, and Advanced are to be listed by the designer. These data are then configured into the ESE.

These configured data are in turned translated to Application Programming Interface (API) which interacts with static html, javascript or cascading style sheet files to form Enterprise Application as web application and on the hand interacts with native client application as Desktop/Mobile/Tablet App. These are output by the ESE into the operating devices such as PC, Tablet or Mobile Phone.

The inter-relationships of components of the ESDM and ESE may be seen from FIG. 6. An example of how the configuration of information entered by an user in the Leave Application Module—Information, Activity, State and Flow are mapped from the inventive ESDM template by the ESE would be described by reference to FIG. 6 and FIG. 7.

The ESE loads the configuration of data from the Template.

Configuration (ESDM) is saved onto database. Configuration (ESDM) defines how an application should behave under Enterprise Software Engine (ESE)

The menu is the entry point of the module (Leave Application).

User interaction always start with the menu. Once an user clicks on the menu or its submenu, the system would redirect the user to a designated list with configured columns and filtering logic.

List is a listing of the records that met certain predefined conditions in various presentation formats i.e. Table, Listing, Card with selected information displayed based on the configuration logic.

At the list, user is presented a list of buttons representing different actions based on default action for that list or selected entry.

The user takes action by selecting from the list of buttons representing various activities which may be done for the list or entry. The user would click on the button either to complete a form by keying in information or to display or generated a document or report.

Once the form is filled and submitted, the user would be re-directed back to the list.

It may be seen that the business requirements prepared by an user for a particular application are mapped and reduced by the template provided in the ESDM configuration. These business requirements are further mapped and reduced by the ESE and rendered into Applications on the Web or onto a Desktop or a mobile Phone or Tablet.

The cycle is repeated. It may be seen that the user would be entering data or taking action on an activity on the menu. As such, the user is not faced with handling technical issues but handling the data/record intuitively based on the corporation's activities. Furthermore since the user is most familiar with procedures in the enterprise, the user would naturally detect any error in data or information and would be able to correct any flaw in logic flow or activity.

Figure 8:
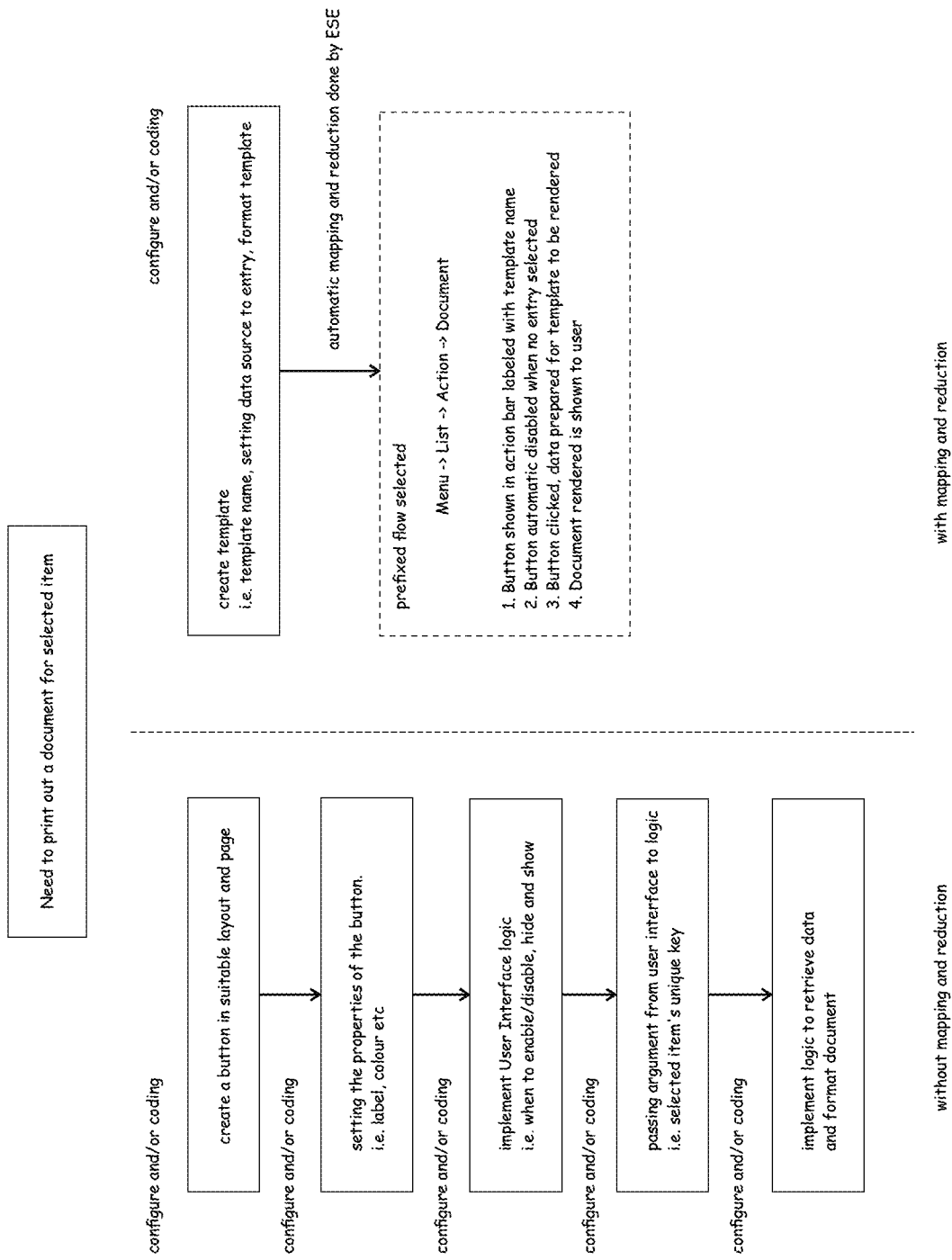
FIG. 8 is a flow diagram illustrating the comparison of the process of developing a business requirement with the need to print out a document based on selected item between with mapping and reduction technique and without mapping and reduction technique, in accordance with the present invention.

FIG. 8 is a flow diagram illustrating the comparison of the process of developing a business requirement that need to print out a document based on selected item between with mapping and reduction technique and without mapping and reduction technique (prior art).

For the same process using the prior art, it may be seen that in order to give instructions to the application/system to print a document, the software developer has to either configure or code:
create a "Print" button in suitable layout and page
set the properties of the "Print" button i.e. label, color etc.
implement an User interface logic i.e. when to enable/disable printing, hide and show
passing argument from user interface to logic i.e. selected item as unique key
implement logic to retrieve data and format document for printing job For the inventive method, the user would:
create a template—template name, setting data source to enter, format template
the ESE would automatically map and reduce the data and requirements
the ESE would select the prefixed flow—Menu→List→Action→Document
A button would be shown in the action bar labelled with template name
The button would be automatically disabled when no data is entered
When the button is clicked, data prepared for template is rendered
Document rendered is displayed to the user The comparison of the configure and coding with the ESDM and without the ESDM shows how the Dynamic Enterprise Software Platform generates and ensures software integrity and functionality by capturing the intention of business process developer and software developer rather than their instructions. This eliminates possibility of functions or buttons which would not work or very glaring mistakes or bugs in the system.

By using a simple print job procedure, it may be seen that the ESDM and ESE would cut down the number of configuration and coding steps usually taken by a software developer.

Figure 9:
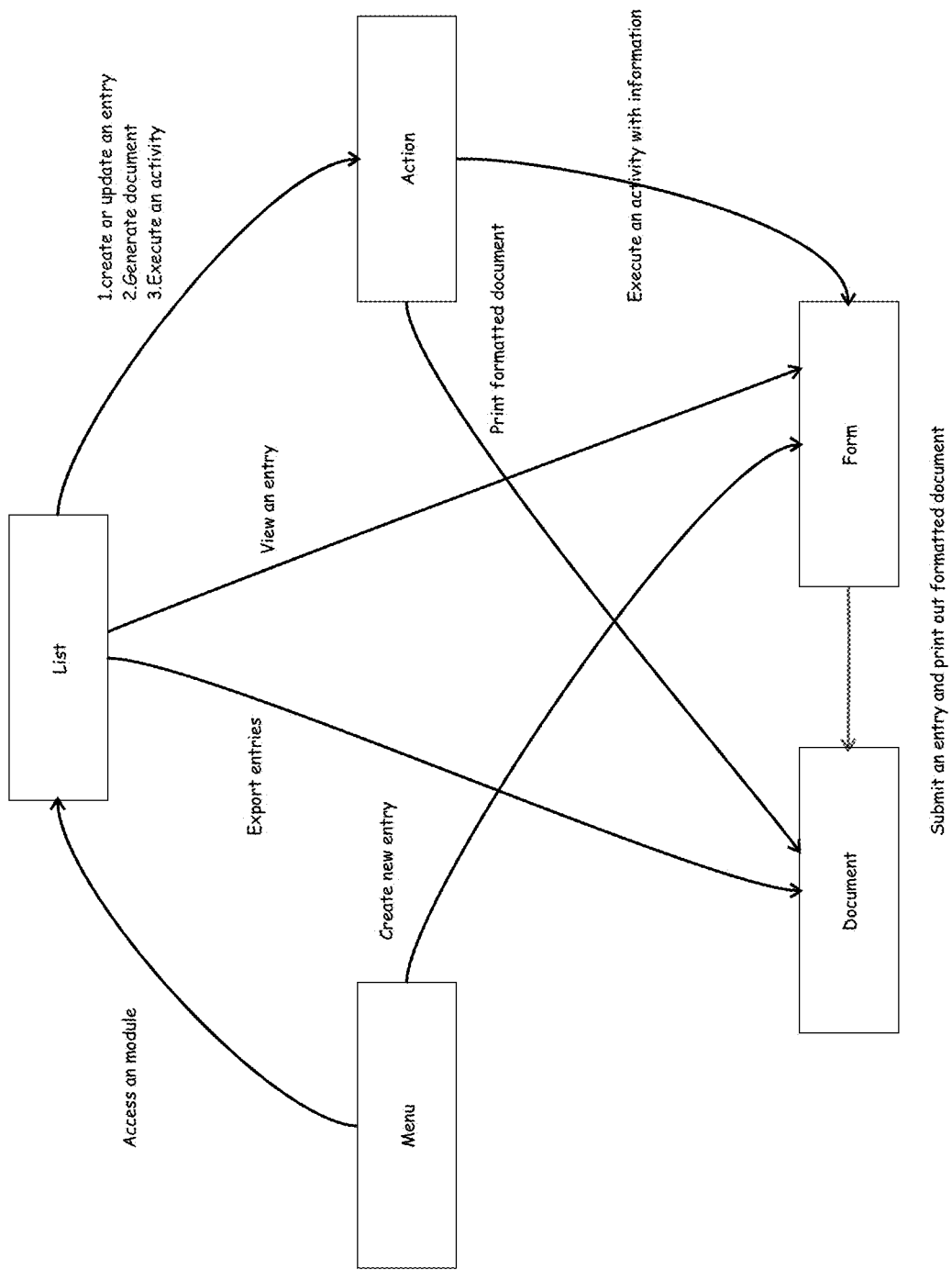
FIG. 9 is a block diagram illustrating example of user experience flow in between five main building blocks of an enterprise software, showing the possible movements between building blocks, in accordance with the present invention.

FIG. 9 is a block diagram illustrating example of user experience flow in between five main building blocks of an enterprise software. This example shows the possible movements between building blocks. Through different permutation of the building blocks, a vast number of scenario or use case can be achieved.

The five main building blocks of the ESE are:
Menu
List
Action
Form
Document

Figure 10:
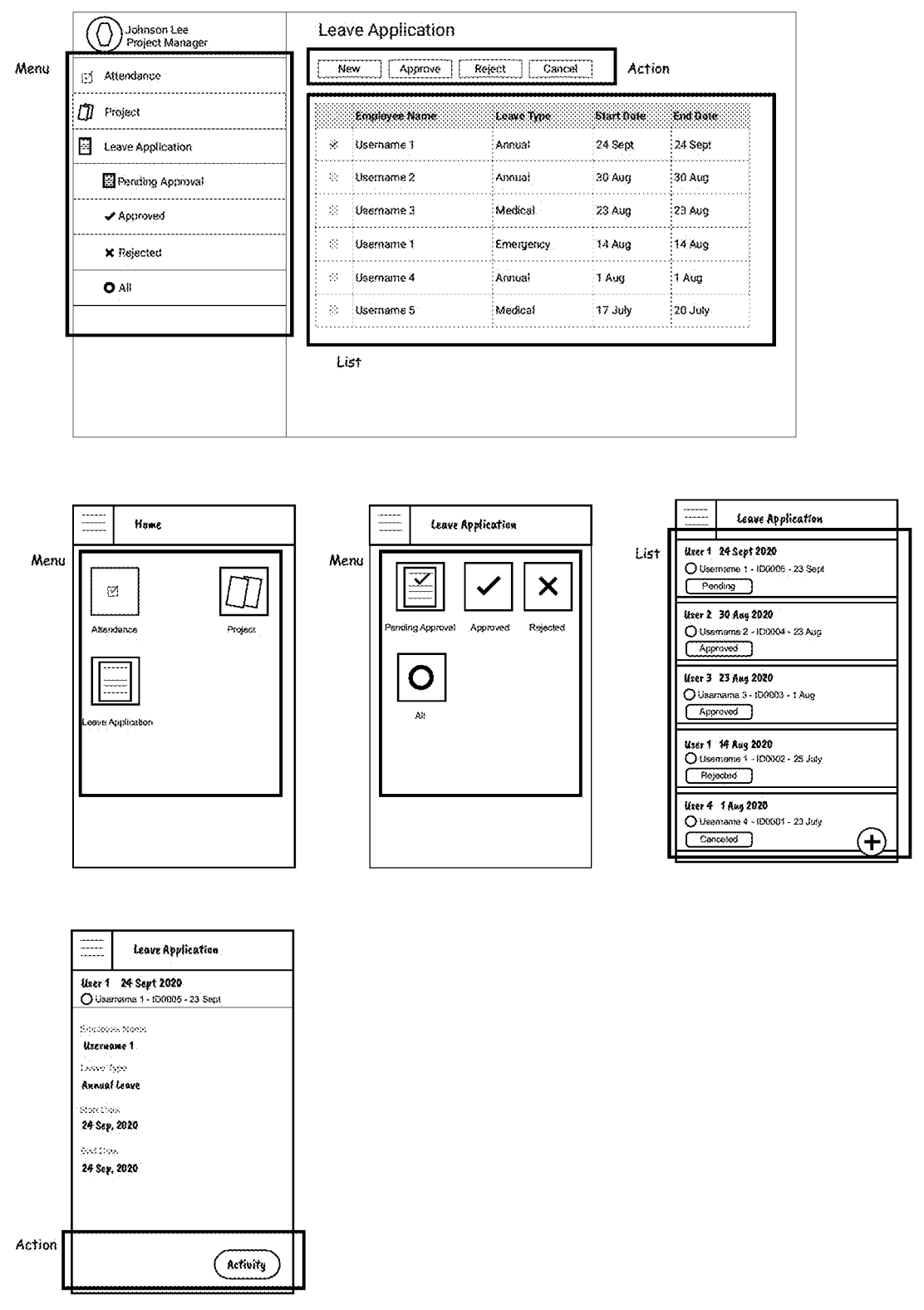
Figure 12:
FIG. 12 is an example of user interface illustrating one of the main building blocks, Document in the Enterprise Software Engine, in accordance with the present invention.
Figures 13A, 13B:
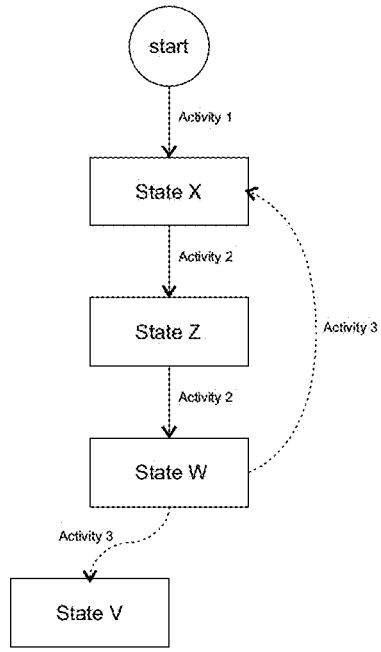
FIG. 13A is a typical flow which describes the possible activities that can be done for a state in a process or record and the outcome of performing the activities, presented in graphical form (flow diagram)
FIG. 13B is a typical flow which describes the possible activities that can be done for a state in a process or record and the outcome of performing the activities, presented in table form.

A simple Leave Application built by an user using the ESDM and ESE mapping and reduction method is illustrated using FIG. 10, FIG. 11 and FIG. 12.

FIG. 10 is an example of user interface that based on main building block of Menu, Action and List in the Enterprise Software Engine.

The Menu in FIG. 10 serves as primarily entry or starting point for each module in developed enterprise software. It consists of the module as well as its submenus which reduced from the Listing on ESDM.

The List in FIG. 10 is the combination of user interface to show collection of entries or records, it may be presented in different format such as table form, list form and card form etc. Besides, it also includes controls for user to search, query or filter records, group and sort search results as well as paginator to allow user to navigate through different pages of result.

Action in FIG. 10 refers to a list of buttons that represents different function that can be done by users such as viewing or editing an entry or generating a document from an entry. Each action has certain logic to display or hide from the user based on condition.

FIG. 11 is an example of an user interface illustrating one of the main building blocks, Form in the Enterprise Software Engine.

The Form in FIG. 11 is the main working area for user to fill in information or view an existing entry. It generally comprises different labels and fields and more complex controls such as table or tabs.

FIG. 12 is an example of an user interface illustrating one of the main building blocks, Document in the Enterprise Software Engine.

The Document in FIG. 12 is the display of document in the form of a plain text, common separated values, spreadsheet or Portable Document Format (PDF). Through this component, user may choose to download the displayed document or print it out.

A simple Leave Application built by an user using the ESDM and ESE mapping and reduction method is illustrated using FIG. 10, FIG. 11, FIG. 12, FIG. 13A, FIG. 13B, FIG. 14A and FIG. 14B.

Building a Leave Application

Based on the inventive features of the invention, a Core section in ESDM comprising the four (4) key requirements for the working of the invention is given to users. Users would follow these lists to carry out the preparation work, which consists of 4 parts:

All four parts namely Information, Activity, State and Flow are to be listed by the designer. Information is the inputs or fields needed when adding a new record and perform an activity for an existing record. An example of a table showing the type of information to be entered when adding a new record and performing an activity for an existing record is shown below:

| Information #information | Type @type |
| --- | --- |
| Field Name A | Text |
| Field Name B | Select |
| Field Name C | Multiline Text |

* Information is denoted as #information @type, for example: #Employee Name @Text, #Leave Type @Select In this Example of Leave application software, the user would start with adding a leave application request, employee needs to fill in the employee name, leave application dates and leave type.

To reject the leave application, manager needs to input the reason of rejection. In this same example of leave application, information includes, employee name, leave application dates, leave type and reason of rejection. This is shown in the table below.

| Information | Type |
| --- | --- |
| #Employee Name | @Text |
| #Leave Type | @Select |
| #Reason of Rejection | @Multiline Text |
| #Start Date | @Date |
| #End Date | @Date |

The type of information includes but not limited to:

| Type | Description |
| --- | --- |
| Text | Single line text |
| Multiline Text | Multiple line text |
| Yes/No | Yes or No |
| Integer | Integer number |
| Number | Number with floating point |
| Currency | Currency |
| Date, Date Time | Date or Date with Time |
| Connection | Connection to another module |
| Image, Images | Image, photo, or picture |
| File, Files | File in various formats such as PDF, text files. |
| Table | Table with Columns. Each column is nested Information |
| List | List with Fields. Each field is nested Information |
| User | User in the system |
| Content | Rich Text, text with style and format |
| Email | Email |
| Phone Number | Phone Number |
| Select | One option from list of predefined options |
| Tag | Multiple options from list of predefined options |
| Signature | Digital signature |

These information can be classified according to the time of input. In this example, #employee name, #start date, #end date and #leave type are classified for adding new record while #reason of rejection is classified for rejecting a record.

An Activity may carry payload, or information gathered or generated as Classification when the activity is executed. Classification is the subset of Information.

Activity can be denoted as (activity), for example: (Submit) or (Approve/Reject).

| Activity (activity) | Classification (from information) |
| --- | --- |
| Activity 1 | #Field Name A, #Field Name B |
| Activity 2 | #Field Name A |
| Activity 3 | #Field Name C |
| Activity 4 | |

In this example of Leave Application, user submits leave application through Create activity, whereas manager approve or reject the leave application through Approve or Reject activity.

| Activity (activity) | Classification |
| --- | --- |
| Create | #Employee Name, #Leave Type, #Start Date, #End Date |
| Approve | |
| Reject | #Reason of Rejection |
| Cancel | |

The ESDM template above for creating a record for a Leave Application will be reduced to as illustrate in FIG. 10, FIG. 11 and FIG. 12.

When Information is needed when performing an activity—e.g. rejection of Leave Application, from the ESDM as illustrate in FIG. 10, FIG. 11 and FIG. 12.

State refers to the possible states (status) of an entry. A Summary of the status of a process or record.

| State [state] |
| --- |
| State X |
| State Y |

-continued

| State [state] |
|---|
| State Z |
| State W |
| State V |

A state can be denoted as [state], for example for a Draft Leave Application Module, like this:

| State |
|---|
| [Pending Approval] |
| [Approved] |
| [Rejected] |
| [Cancelled] |

Flow describes the possible activities that can be done for a state in a process or record and the outcome of performing the activities. It can be presented in graphical (flow diagram) which looks like the drawing in FIG. 13A. Alternatively the outcome of performing the same activities may be presented in a table form, in which case it would look like the table in FIG. 13B.

Figures 14A, 14B:
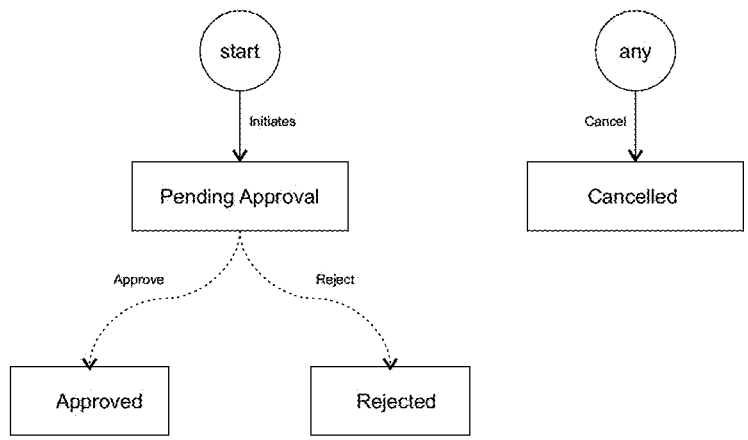
FIG. 14A is an example of a flow diagram based on the logic of the process of a Leave Application. The leave application may be approved or rejected or cancelled, as shown in a flow diagram.
FIG. 14B is an example of a flow diagram based on the logic of the process of a Leave Application. The leave application may be approved or rejected or cancelled, as shown in a table.

The flow diagram is based on the logic of the process. FIG. 14A and FIG. 14B is an example of 1.0 Leave Application, the leave application may be approved or rejected or cancelled. FIG. 14A shows a flow chart while FIG. 14B is an example of a Flow Table which shows the same states.

It may be seen from the description of constructing the Leave Application Module, an user in the enterprise would be able to carry out the construction of the Leave Application Module using the 4 Lists described above.

The ESDM information configured and entered by users can be enhanced further by software developer such as perspective of authorizations, automations in the process of constructing the software application. The users would then have a chance to try to test the application. Since the inventive method allows repeat changes, the users would eventually be able to construct a working Leave Application Module. Consequently, with repeated modifications, the users would be able to complete a Leave Application Module suitable for the requirements of the enterprise. By using this Leave Application Module as an example, it may be seen that the software developers would be able to link the Leave Application Module to the Enterprise Solution Engine and eventually connect the Leave Application Module to the main IT systems of the enterprise.

How the ESE Works with the Configuration of Data for Leave Application

The relationship between the ESDM and ESE, how the ESE works and more details of the mapping and reduction of data configurations would be described by reference to FIG. 15, FIG. 16, FIG. 17, and FIG. 18.

Figure 15:
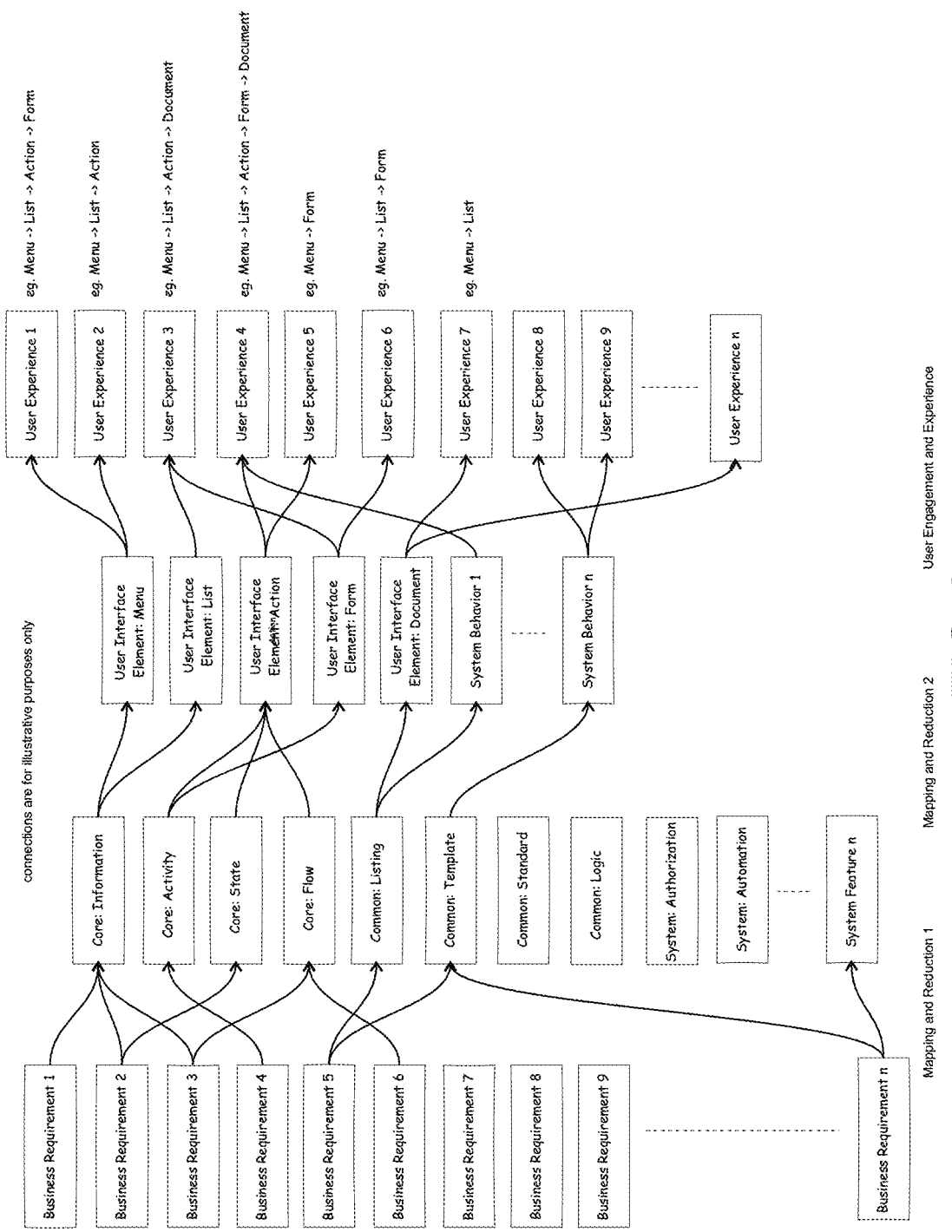
FIG. 15 is a block diagram illustrating process of 2 stage mapping and reduction from business requirements to Enterprise Software Design Model and further to Enterprise Software Engine and lastly how business requirements are met through the use of the flow permutation of main building blocks, in accordance with the present invention.

FIG. 15 is a block diagram illustrating process of 2 stage mapping and reduction from business requirements to Enterprise Software Design Model and further to enterprise software and lastly business requirements are met through the use of the flow permutation of main building blocks.

FIG. 16 is an example of user interface for developers to configure Enterprise Software Design Model on Dynamic Enterprise Software Platform.

Figure 17:
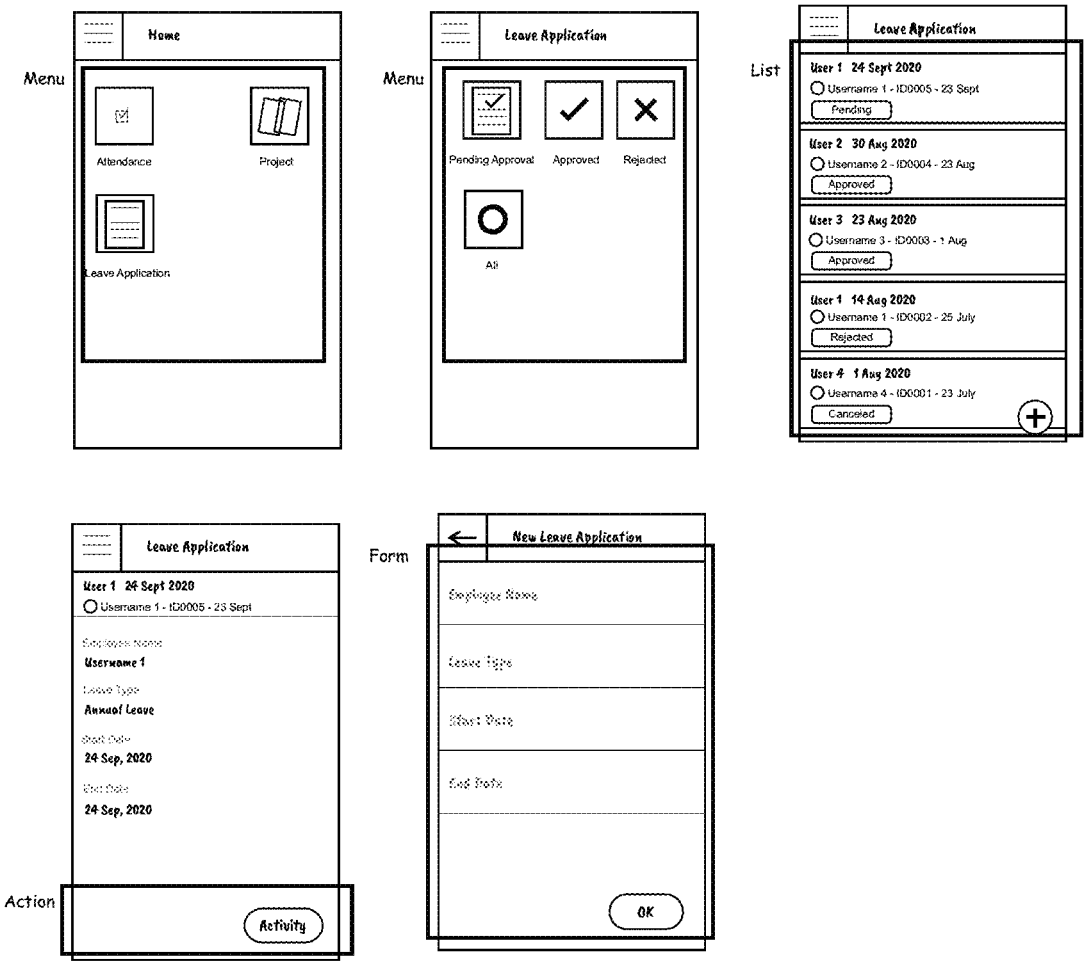
FIG. 17 show examples of user interface rendered from the ESDM by ESE on a mobile phone, in accordance with the present invention.
Figure 18:
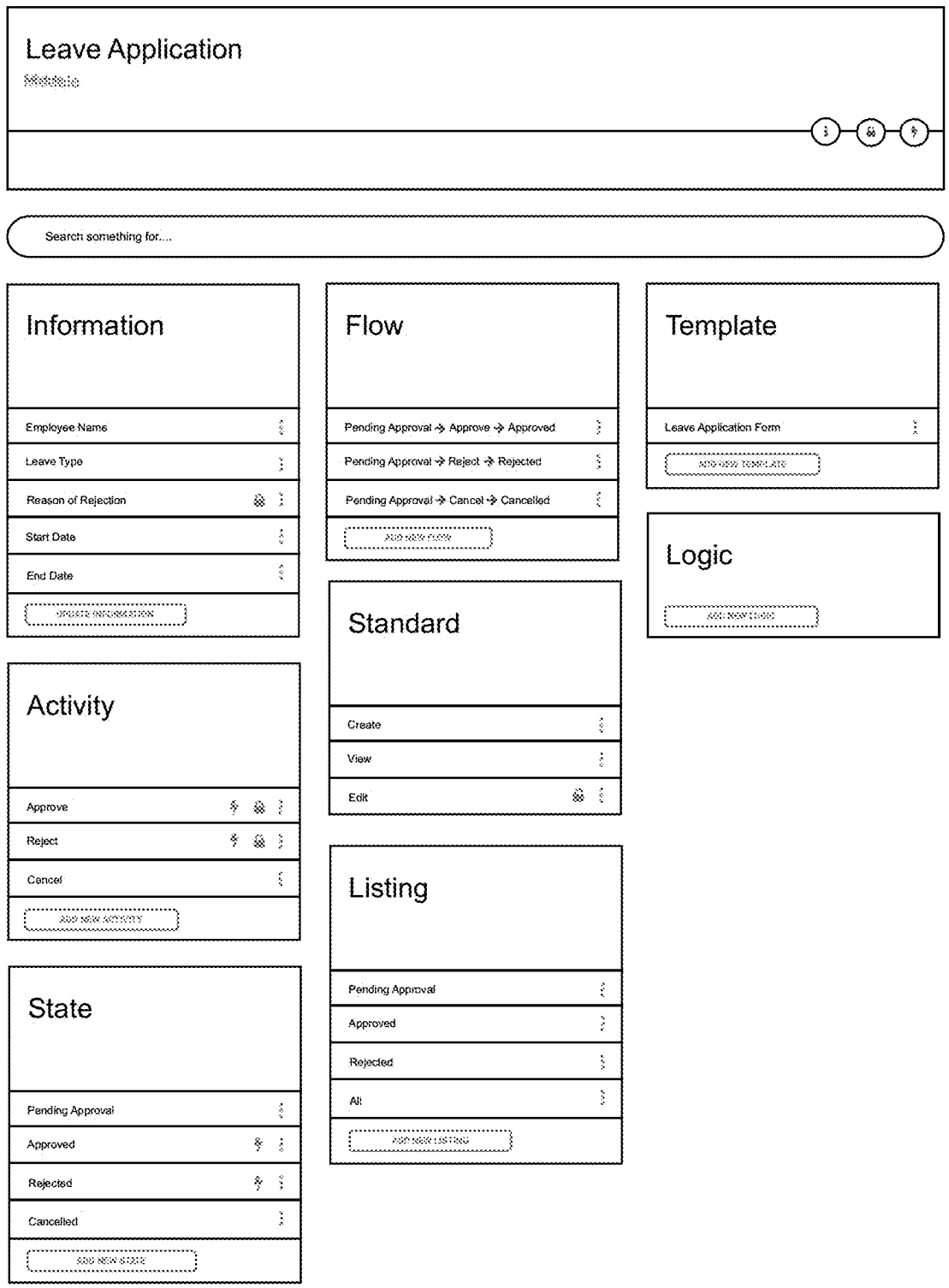
FIG. 18 is a single screenshot wherein all configurations are consolidated into a single screen, such as a Desktop or Personal Computer or Tablet, in accordance with the present invention.

FIG. 17 show an example of a screen shot of the user interface rendered from the ESDM by ESE in a Mobile phone or Tablet. (In the preceding paragraphs, FIG. 10, FIG. 11 and FIG. 12 show an example of a screen shot of the user interface rendered from the ESDM by ESE in a Personal Computer.)

The ESE stores Module data in JSON format or other permissible format such as XML. The format/schema is consistent with the inventive ESDM template of this invention. The ESE consists of five components.

Table below show more examples of permutation of the building blocks and its related scenarios or use cases.

| User Experience Flow | Description |
|---|---|
| Menu -> List | View entries in different format such as table, list, card, or calendar |
|  | Filtering or search entries on the list |
| Menu -> List -> Action | Approve, reject, or cancel an entry or a submission |
| Menu -> List -> Action -> Form | Create new entries, new submission, or new request, submitting new activity |
| Menu -> List -> Action -> Form | Edit existing entry |
| Menu -> List -> Action -> Form -> Document | Create an entry and print document |
| Menu -> List -> Action -> Document | 1. Select an entry and generate document 2. Generate a report from list |
| Menu -> List -> Document | Export list into PDF or spreadsheet |
| Menu -> List -> Form | View an entry |
| Menu -> Form | Add new entry |

The building blocks and relationships are illustrated In FIG. 13 wherein the ESE maps and reduces ESDM into few building blocks for the purpose of well-defined scope of the development for Enterprise Software Engine and its resulted enterprise software. These building blocks are predefined and built-in in ESE and developed by engineers of DESP beforehand. Each building block will behave differently based on different configuration though the possibilities are still limited to its purpose discussed for each building block, respectively.

The final number of building blocks needed to be defined, planned, implemented, and tested is small and finite. This is one of the key factors which make possible that for the entire enterprise software to be generated wholly and solely by Enterprise Software Engine without any intervention of programmers, software developers or code generation.

An Inventive ESS which is designed and developed specifically would be able to process data and information using the ESDM mapping and reduction process into functional enterprise application without any intervention of human or Software Developer.

One of the key inventive features of ESS is to remove the need for code generation and compilation as well as deployment.

The Invention revolutionize the process of mapping all Business Requirements, Requirement Engineering and Process Design such that it allows direct involvement of the users. As expected, development of software applications of the enterprise can solely be done by Business Process Developer with or without the assistance for Software Developer. Software Developer on the other hand, able to enhance or improve the software applications by introducing complex functionality or system behavior.

The Business Process Developer may be involved in some activities other than for most simple workflow or application.

The typical user interaction of resulted enterprise software is as follows.

It starts with Menu

Once user click the menu, system will redirect user to designated list with configured columns and filtering logic At the list, user is presented list of buttons (refer to FIG. 5) representing different actions based on default action for that list or selected entry User clicks the button either will a form for keying in information, or display a generated document or report Once form is filled and submitted, user is redirected back to List And the cycle repeats ESE generates enterprise software application based on mapping and reduction technique.

| Building Block | ESDM | Description |
|---|---|---|
| Menu | Module Listing Authorization | Main menu in FIG. 10 is translated from Module (ESDM Configuration) name such as Attendance, Project, and Leave Application, whereas submenu is translated from Listing (Common section) from respective module, such as Pending Approval, Approved etc. On top of that, the final displayed is determined by FIG. 14. Authorization (Advanced section) |
| List | Information Listing Authorization | FIG. 10 - List column is based on Information (Core section), the filtering and condition on the entries shown in list is based on Listing (Common section). On top of that, the final displayed is determined by FIG. 14 Authorization (Advanced section) |
| Action | Standard Activity Flow Template | FIG. 10 - Action is the combination of Standard (Common section), Activity (Core section), Flow (Core section) and Template (Common section). It shows the standard action such as create, view, delete based on authorization as buttons. Then combines with activity that can be executed based on current state and flow FIG. 14 and authorization as button as lastly template as buttons to generate report or document based on Authorization (Advanced section). |
| Form | Information Standard Activity Aesthetic | FIG. 11 - Form is computed based on Information (Core section), Standard (Common Section) and Activity (Core section), Information determines what are the type of field or input and label to store and show, whereby activity and standard determines what fields to show or allow to input. It can be further enhanced for its layout or other aesthetic elements such as content, image, tabs through Aesthetic (Advanced section) |
| Document | Information Listing Template Logic Authorization | FIG. 12 - Document is generated based on Information (Code section), Listing (Common section), Template (Common section), and optionally Logic (Common section). It checks whether user will have the access to particular report or document based on Authorization (Advanced section). |

It may be seen that the inventive ESDM and ESE works as follows:

Users define the information they require or expect from the application in ESDM Predefined building blocks are rendered by ESE based on configured ESDM Number of steps depends on the complexity of the desired outcome Complexity of application can be always added in the later stage without the need for rebuilding the whole solution Existing data, entries or records are still valid after each change in ESDM By using fixed definitions of 4 Standard Lists—Information, Activity, State and Flow (Core section from ESDM), the user may intuitively build a simple Module (Application) in 1 step. The order is not important. Once users are able to define the information, the activities, the state and flow, the ESE would be able to map the user configuration to provide the enterprise software application user interface through the combination of five main building blocks, namely Menu, List, Action, Form, and Document as shown in FIG. 9 and FIG. 15. Through the permutation flow of these main building blocks, various user experience flows are derived.

Inventive Steps

The inventive steps of the DYNAMIC ENTERPRISE APPLICATION PLATFORM of the Invention are as follows:

1. Simplify enterprise design process into declarative approach rather than imperative or procedural approach.
2. The ESDM provides a template for users to prepare their data and report requirements in a simple format, enabling users who do not possess any technical knowledge or software development training to design and develop simple applications in a short period of time.
3. The ESDM enhances the communication between business process developer and software developer Existing software application development approach requires users or consultants to design step by step to dictates computer (either through programming/coding or in low-code platform through User Interface) on how to response on users' interaction in an enterprise software, i.e. Users will need to design through UML or User Interface, flow of each User Interface page or screen, and then either through traditional coding method or low code platform's user interface to develop the enterprise application. However, the design requires technically trained personnel which in turn requires communication between a technical person (software developer) and non-technical person but expert in the process expert (business process developer). As understanding of a design such as UML or BPMN requires technical knowledge, whereby business process developer may not have sufficient knowledge to understand the design, the feedback loop is broken and communication breakdown likely to occur.

The inventive approach does away with the need of design and understanding of technically intensive design steps and documentation such as UML or BPMN. The new inventive approach allows Business Process Developer with or without the collaboration of Software Developer to design the key elements of an enterprise application. It prevents communication breakdown as both Business Process Developer and Software Developer can communicate through the new Enterprise Software Design Model. On top of that, software developer may still be able to value add by enhancements of the application software through additional inputs in authorization control, user experience design, generating notification, producing formatted document or print out and automation which on top of the key elements co-designed and verified by Business Process Developer.

To a certain extent, for simpler application such as Approval or Request submission, e.g. Leave Application Module, a Business Process Developer is even able to 'develop' a software application for "Leave Application" without the need of Software Developer's involvement. However the Software Developer would still be involved in linking up different applications within the Enterprise and interfaces between different modules or applications within the Dynamic Enterprise Software Platform.

An example of building a simple application in 1 step would be Product Management application, which requires:
Define Information (Listing)

An example of building a typical Application using 2 steps would be for example, Employee Management), which requires:
Define Information (Listing)
Define State (Listing)

Building a typical Application in 3 steps (for example, Leave Application Management) requires:
Define Activity together with Information (Listing and Drag & Drop)
Define State (Listing)
Linking Activity with State into Flow (Listing and Drag & Drop)

Building a typical Application in 4 steps (for example Procurement Approval) requires:
Define Information (Listing)
Define Activity with existing Information (Listing and Drag & Drop)
Define State (Listing)
Linking Activity with State into Flow (Listing and Drag & Drop)

Advantageous Effects of the Invention

The present invention provides an Enterprise Software Design Model (which is a template) for non-technically trained users to build configuration data for an application software using data and workflow from their own function/department. The invention then uses an Enterprise Software Engine to consume the configuration data, mapping and reducing the configuration data into finite sets of building blocks then generate the software application in different form factor such as desktop, web-based, tablet and mobile for the enterprise.

The present invention offers users a direct approach to building application software for their own without the assistance of a technically trained person with programming and software design knowledge. The present invention therefore not only reduces costs and time but ensures users are able to implement software application which suit their requirements.

Thus this present invention brings the users a step nearer the objective of citizen developers, building software application in their own domain.

What is claimed is:

1. A Dynamic Enterprise Application Platform, stored in a computer system for development of application software in which users develop application software for their enterprise without the assistance of software consultants, comprising:
an Enterprise Software Design Model (ESDM) which works with an Enterprise Software Engine;
wherein the ESDM is a template for the users to submit details of a specific application and data and information gathered by the users are configured by the Enterprise Software Design Model and saved into database of Dynamic Enterprise Software Platform where the Enterprise Software Engine performs a mapping and reduction procedure to create functional enterprise software application using visual editor with drag and drop interface, without the users undertaking any programming/coding training.

2. The Dynamic Enterprise Application Platform for development of application software as claimed in claim 1, wherein a plurality of forms of enterprise software are rendered onto Desktop Application, Mobile/Tablet Application, and Web/Cloud Application.

3. The Dynamic Enterprise Application Platform for development of application software as claimed in claim 2, wherein data and information are being configured and consolidated into a single page or single screen of the Desktop Application, the Mobile/Tablet Application, and the Web/Cloud Application.

4. The Dynamic Enterprise Application Platform for development of application software as claimed in claim 1, wherein the Enterprise Software Design Model comprises three sections, including Core, Common and Advanced Section.

5. The Dynamic Enterprise Application Platform for development of application software as claimed in claim 4, wherein the Core Section comprises Information section, Activity section, State section and Flow section wherein:
the Information section is information gathered or generated in a process or entry;
the Activity section is the action being done in a process and the information gathered or generated;
the State section is a summary of the status of a process or record; and
the Flow section is the possible activities to be performed for a state in a process or record.

6. The Dynamic Enterprise Application Platform for development of application software as claimed in claim 4, wherein the Common section comprises Listing section, Standard section, Template section, and Logic section, wherein:
the Listing section describes different grouping of the records or entities based on designated filters and conditions;
the Standard section describes common features existing in enterprise software, such as create, edit, delete, or view;
the Template section describes formatted document or customized report that is to be generated; and
the Logic section is special business logic to be performed to retrieve or aggregate data for display or generating report as well as supporting integration of external services.

7. The Dynamic Enterprise Application Platform for development of application software as claimed in claim 4, wherein the Advanced Section comprises Aesthetic section, Authorisation section, and Automation section, wherein:
the Aesthetic section refers to design of the form such as layout, contents, formatting of text and number, as well as formulas;
the Authorization section describes the rights to access, execute or view for a user or group of users; and
the Automation section occurs when some events happened and the Enterprise Software Engine (ESE) are triggered, sending notifications such as email, message or SMS, or integration to other online services, or internal action to update the record.

8. The Dynamic Enterprise Application Platform for development of application software as set forth in claim 1, wherein the Enterprise Software Engine comprises five sections, including Menu, List, Action, Form and Document.

9. The Dynamic Enterpise Application Platform for development of application software as claimed in claim 8, wherein the Menu Section of the Enterprise Software Engine serves as primarily entry or starting point to a module in a developed enterprise software.

10. The Dynamic Enterprise Application Platform for development of application software as claimed in claim 8, wherein the List Section of the Enterprise Software Engine combines with an user interface to show collection of entries or records, representing the entries or records in different formats, including a table form, a list form, a card form or a calendar form and for the user to search, query or filter records, group and sort search results and allow the user to navigate through different pages of results.

11. The Dynamic Enterprise Application Platform for development of application software as claimed in claim 8, wherein the Action Section of the Enterprise Software Engine are a plurailty of buttons that represent different functions that can be performed by the users such as viewing or editing an entry or generating a document from an entry and has certain logic to display or hide information from the user based on a plurality of set conditions.

12. The Dynamic Enterprise Application Platform for development of application software as claimed in claim 8, wherein the Form Section of the Enterprise Software Engine serves as a main working area for the user to fill in information or view an existing entry, and generally comprises a plurality of labels and fields and complex controls such as table or tabs.

13. The Dynamic Enterprise Application Platform for development of application software as claimed in claim 8, wherein the Document Section of the Enterprise Software Engine is the display of document in the form of plain text, common separated values, spreadsheet or Portable Document Format (PDF) and allows the users to choose to download a displayed document onto a Personal Computer, a Tablet or a Mobile Phone or to print the document.

14. The Dynamic Enterprise Application Platform for development of application software as claimed in claim 1, wherein the information entered into the Enterprise Software Design Model are configured, mapped and reduced by the Enterprise Software Engine into a functional enterprise software application and which allows iteration effort so that the user may always add in information or activity to the process in order to amend the document or form in real time, whenever the user thinks is necessary without disrupting existing running entries.

15. A method of creating software application in a Dynamic Enterprise Application Platform having an Enterprise Software Design Model and an Enterprise Software Engine in a computer system, said method allowing users to develop an application software for enterprise without the assistance of software consultants, and without the users undertaking any programming/coding training, comprising the steps of:

creating and configuring data and information using the Enterprise Software Design Model, for processing by the Enterprise Software Engine through a mapping and reduction process; wherein said data and information configured by the Enterprise Software Design Model are saved into a database in the Dynamic Enterprise Software Platform;

creating functional enterprise software application using visual editor with drag and drop interface where the configured data and information of the Enterprise Software Design Model configuration is consolidated into a single page or single screen of a Desktop Application, an Application in a Personal Computer, a Mobile Phone, Tablet and Web/Cloud Based Application; and allowing iteration effort for the user to add in information or activity to the step of creating the menu, list, action, document or form or the report in order to amend the menu, list, action, document or form in real time, whenever the user thinks is necessary without disrupting existing running entries.

16. The method of creating software application in a Dynamic Enterprise Application Platform as set forth in claim 15, wherein the step of creating and configuring business requirements through the Core Section, Common Section and Advanced Sections of the ESDM is to map and to reduce the data and information through Enterprise Software Engine into a specific application.

17. The method of creating software application in a Dynamic Enterprise Application Platform as set forth in claim 16, wherein the mapped and reduced data and information in Enterprise Software Design Model are further mapped and reduced by the Enterprise Software Engine, the mapped and reduced data being rendered as menu, list, action, document, and form into a Cloud Based App or an App for use with a Desktop or Personal Computer or a Mobile Phone or a Tablet.

\* \* \* \* \*